United States Patent [19]

Pfeiffer

[11] 4,004,556
[45] Jan. 25, 1977

[54] ROTARY INTERNAL COMBUSTION ENGINE OF AXIALLY SLIDING VANE TYPE

[76] Inventor: Rolf Alfons Pfeiffer, 144 Quebec Ave., Toronto, Ontario, Canada, M6P-2T7

[22] Filed: Feb. 16, 1973

[21] Appl. No.: 333,010

Related U.S. Application Data

[63] Continuation-in-part of Ser. No. 68,613, Sept. 1, 1970, abandoned.

[30] Foreign Application Priority Data

Sept. 8, 1969 Germany .......................... 1945388

[52] U.S. Cl. .................. 123/8.45; 418/68; 418/143; 418/125; 418/148; 418/151; 418/219; 418/235; 91/502
[51] Int. Cl.² ..................... F02B 55/14; F01C 1/00; F04C 17/00; F01C 21/00
[58] Field of Search ............... 123/8.23, 8.41, 8.45; 418/219, 235, 140, 228–232

[56] References Cited

UNITED STATES PATENTS

| 482,166 | 9/1892 | Coulter | 418/219 |
|---|---|---|---|
| 570,584 | 11/1896 | White | 418/231 |
| 723,242 | 3/1903 | Cooey | 418/229 |
| 1,686,767 | 10/1928 | Saxon | 123/8.45 |
| 1,952,149 | 3/1934 | Thomas | 123/8.07 |
| 2,536,938 | 1/1951 | Hunter | 418/235 |
| 2,646,753 | 7/1953 | Zoll | 418/219 |
| 3,065,710 | 11/1962 | Krawacki | 418/219 |
| 3,584,608 | 6/1971 | Shibagaki | 123/8.09 |

FOREIGN PATENTS OR APPLICATIONS

| 928,273 | 5/1947 | France | 418/219 |

*Primary Examiner*—John J. Vrablik
*Attorney, Agent, or Firm*—C. C. Kent; K. M. Hill

[57] ABSTRACT

Rotary internal combustion engine of axial sliding vane type has sinusoidal shaped side walls with compensation of the mass forces allowing nearly friction-free and high speed operation with sufficient compression ratio. High power output is believed to make the invention comparable to the well-known Wankel engine.

The various designs of the rotary machines can also be used as fluid pumps or fluid-operated motors.

5 Claims, 44 Drawing Figures

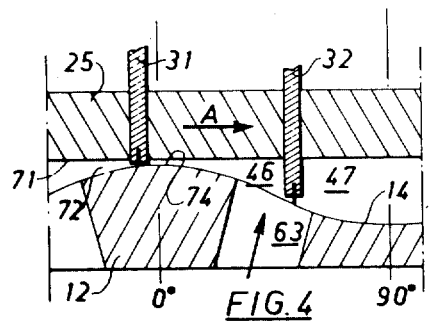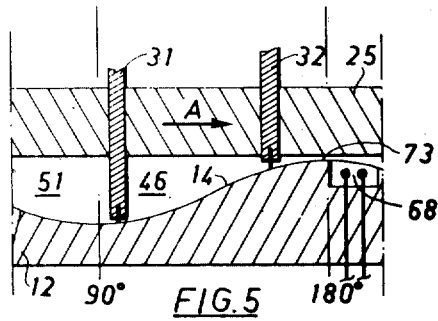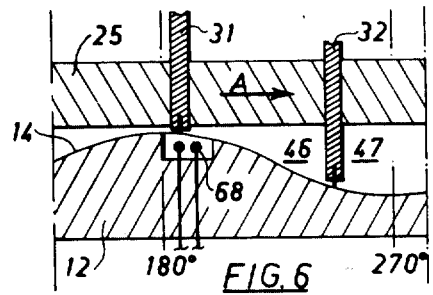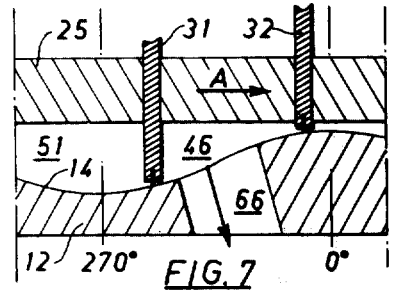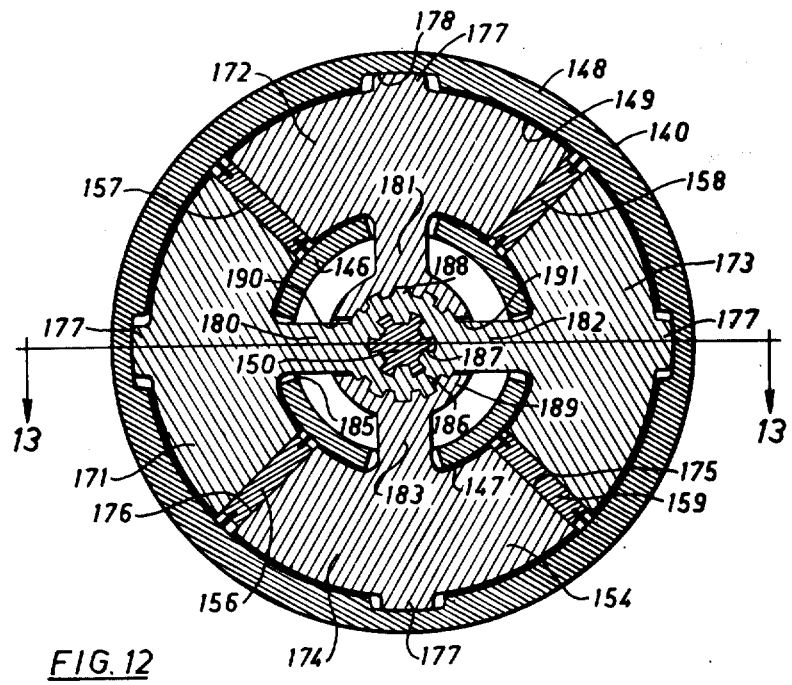

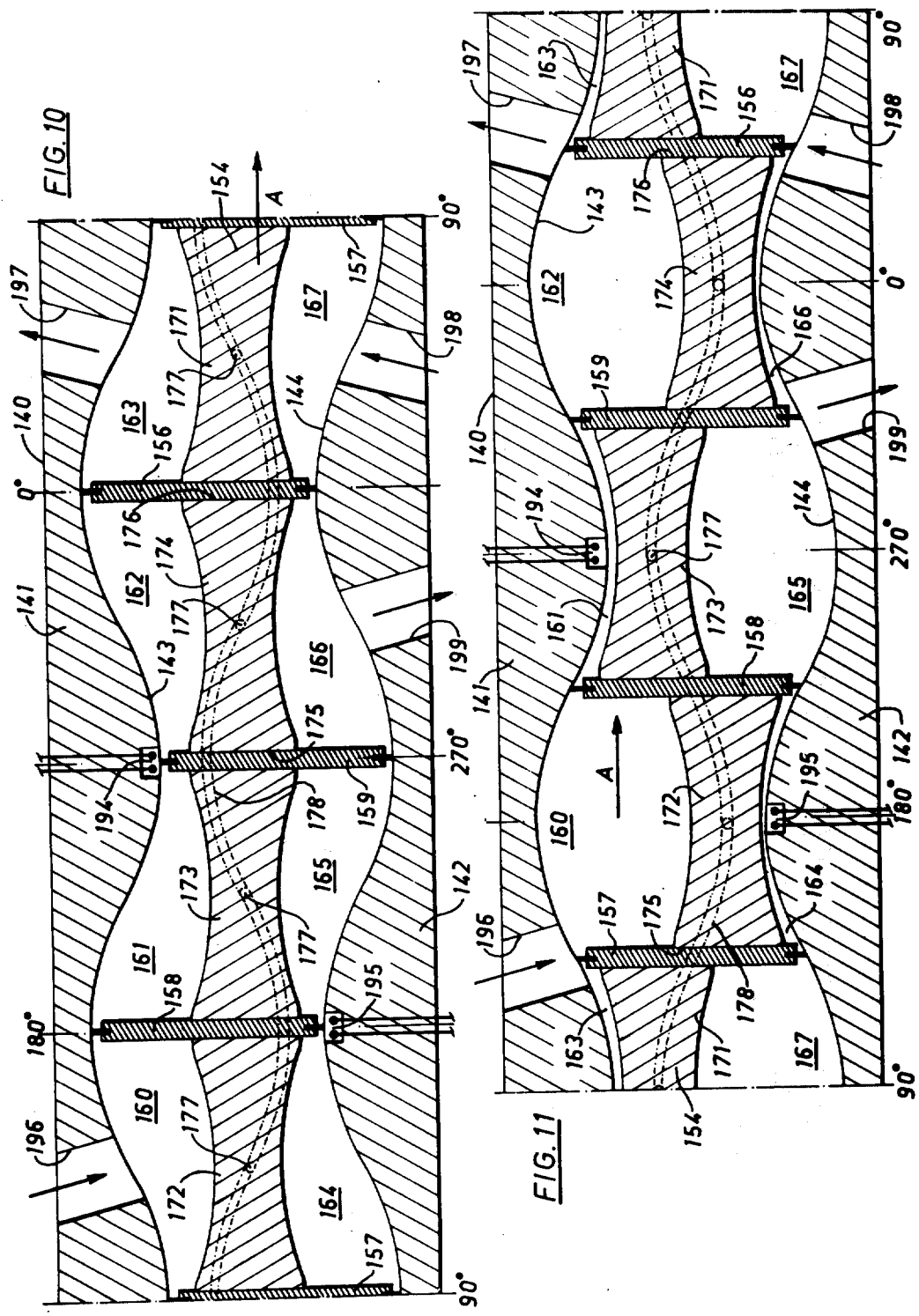

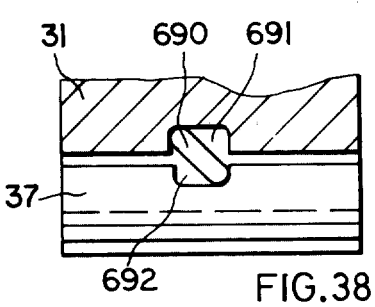
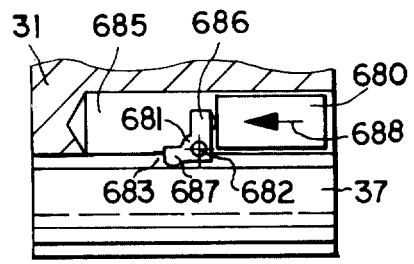
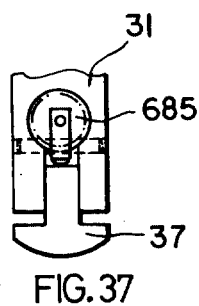
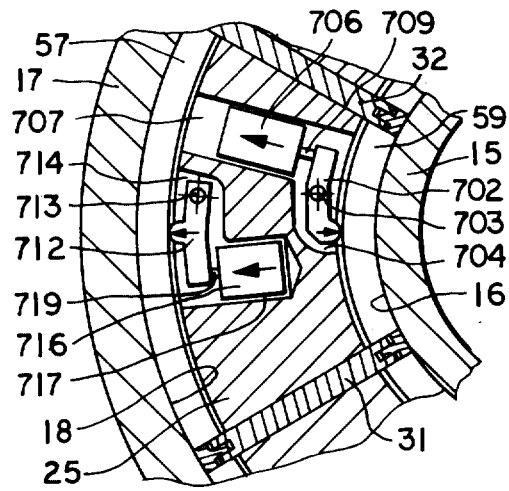
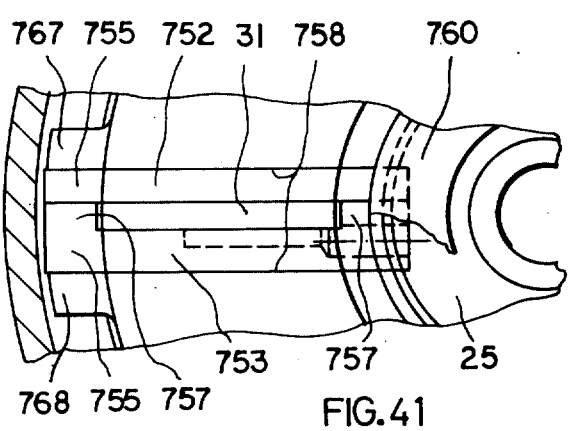
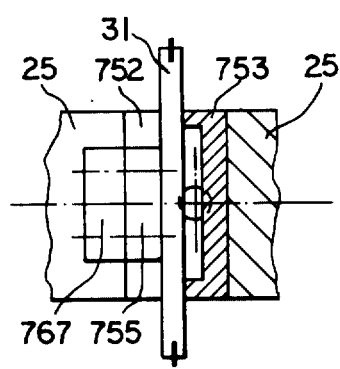
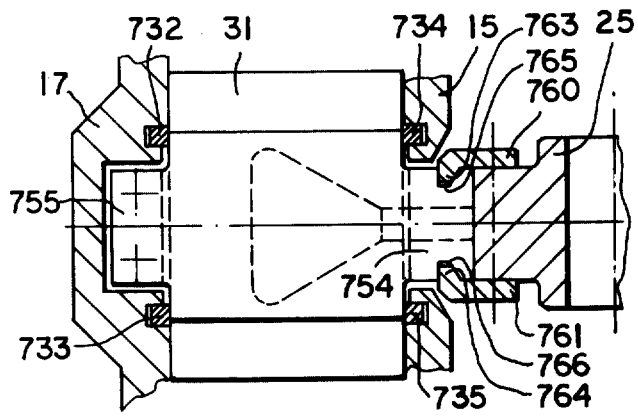
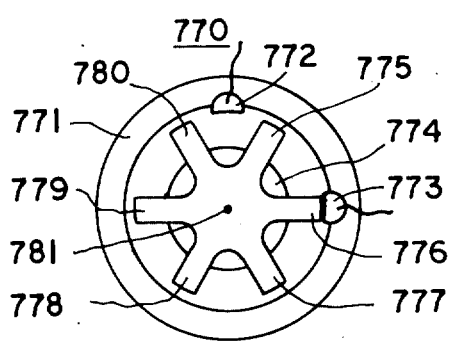
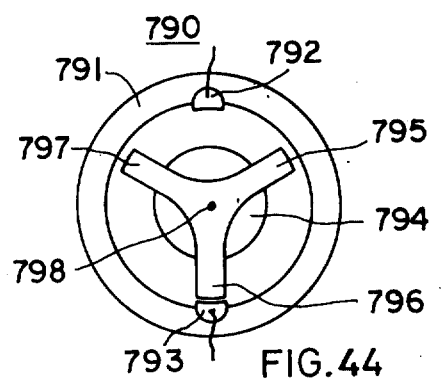

4,004,556

ROTARY INTERNAL COMBUSTION ENGINE OF AXIALLY SLIDING VANE TYPE

BACKGROUND OF THE INVENTION

This invention relates to rotary machines and more particularly to rotary machines which can be constructed for operation as internal combustion engines, fluid-operated motors or fluid pumps. The present application is a continuation-in-part of my copending application Ser. No. 68,613 filed Sept. 1, 1970 and now abandoned.

Numerous efforts have been made for construction or rotary machines, which would be more simply constructed and have fewer parts and be smaller in size and free from unbalanced masses. However, such rotary machines still incorporate disadvantages of high mass forces occurring, and still have complicated constructions, and other difficulties restricting their proper function.

Objects of this invention are: (1) to provide a rotary internal combustion engine which combines advantages of reciprocating piston engines with those of rotary engines. The main advantages of the rotary design are: fewer parts, simpler construction, much higher power output for same size or weight and, according to test results, a lower pollution content on emissions. The proven performance features of the reciprocating engine incorporated in this rotary engine are: the volume variation of the rotary's chambers is exactly similar to the volume variation at the reciprocating engine derived by a crankshaft driven piston. The minimum and maximum volumes are similar, ensuing proper combustion and operation process. The sparkplug is also located at the centre of the combustion chamber for proper ignition and timing. Due to the sinusoidal side walls and volume variation, similarly high rpm speeds are obtainable at the rotary engine. (2) to provide a rotary sliding vane machine being free of radial and axial mass forces of the vanes which, in this respect, allows an unlimited speed, and simultaneously eliminates the material stress on the working surfaces, eliminating also the power loss due to that friction. In eliminating the mass forces it is necessary for the vanes to rotate with their supporting ring. A reversal of the rotating member, as shown in reference U.S. Pat. No. 1,686,767, Saxon, does not allow this feature, and such construction cannot be used for the present invention. (3) to provide a rotary vane machine, where the sealing pressure is obtained by mass forces, rather than by springs.

SUMMARY OF THE INVENTION

The invention involves the use of a rotor body disposed within a stator housing for rotation therein between axially spaced apart housing side walls. The rotor body divides the stator housing into two separate and continuous stator chambers, each of which is divided into individual and mutually isolated compartments by vanes extending axially through the rotor body, variation in the volumes of such compartments being caused by relative axial movement of the rotor body and the vanes.

More broadly, this invention comprises a stator housing including axially spaced apart first and second side walls with opposed radially extending annular and sinusoidally-shaped surfaces having a substantially constant separation; and inner wall extending between said first and second side walls of said stator housing and having a cylindrical peripheral outer surface; an outer wall extending between said first and second side walls of said stator housing and having a cylindrical peripheral inner surface generally parallel to said cylindrical peripheral outer surface of said inner wall; a rotor shaft journalled in said stator housing for rotation therein; a rotor body keyed to said rotor shaft for conjoint rotation therewith and extending outwardly through said inner wall and between said first and second side walls of said stator housing in axially spaced apart disposition relative thereto so as to define with said annular surfaces of said first and second side walls of said stator housing, with said cylindrical peripheral outer surface of said inner wall and with said cylindrical peripheral inner surface of said outer wall, first and second continuous and essentially mutually isolated stator chambers on opposite axial sides of said rotor body; a plurality of vanes slidably supported in said rotor body and extending between said annular surfaces of said first and second side walls of said stator housing and between said cylindrical peripheral outer surface of said inner wall and said cylindrical peripheral inner surface of said outer wall to divide each of said first and second stator chambers into a plurality of essentially mutually isolated compartments and essentially to prevent the passage of fluid material through said rotor body between said first and second stator chambers; the volume variation of the chambers is in axial direction rather than circumferentially, the axial increase and decrease of the chamber volume is similarly with the volume variation of a reciprocating piston engine; a first fluid inlet passage in said stator housing and in fluid communication with said first stator chamber for the sequential supply of a fluid material to individual ones of said compartments of said first stator chamber on rotation of said rotor body in said stator housing; a second fluid inlet passage in said stator housing and in fluid communication with said second stator chamber for the sequential supply of a fluid material to individual ones of said compartments of said second stator chamber on rotation of said rotor body in said stator housing; a first fluid discharge passage in said stator housing and spaced apart from said first fluid inlet passage and in fluid communication with said first stator chamber for the sequential discharge of fluid material from individual ones of said compartments of said first stator chamber; and a second fluid discharge passage in said stator housing and spaced apart from said second fluid inlet passage and in fluid communication with said second stator chamber for the sequential discharge of fluid material from individual ones of said compartments of said second stator chamber; whereby, on rotation of said rotor body within said stator housing, said vanes and said rotor body undergo relative axial movement to cause variation in the volumes of said compartments of said first and second stator chambers and to cause, in turn, fluid material introduced sequentially into said compartments of said first and second chambers through said first and second fluid inlet passages respectively to be discharged sequentially from said compartments of said first and second stator chambers through said first and second fluid discharge passages respectively.

The desired relative axial movement of the vanes and the rotor body can be provided by forming the opposed radially extending annular surfaces of said axially spaced apart first and second side walls of the stator housing of such a machine with corresponding complete and generally sinusoidal configurations in a direction parallel to the axis of the rotor shaft whereby, on rotation of the rotor body within the stator housing, the vanes undergo axial reciprocating movement. Alternatively, the relative axial movement of the vanes and the rotor body can be obtained by dividing the rotor body into individual rotor body segments which are guided for separate axial reciprocation relative to the stator housing and vanes on rotation of the rotor body in the stator housing. In the last-mentioned construction, the opposed surfaces of the side walls can be planar or sinusoidal.

The rotary machines of this invention can be constructed for operation as internal combustion engines for operation either as two-stroke engines or as four-stroke engines and as supercharged engines. Alternatively, such machines can be constructed for use as fluid pumps or as fluid-powered motors.

To describe in initial summary form next, the mass-force feature of this invention; on rotation of the rotor, radial and axial mass forces of the vanes act against the stationary housing causing high friction, wear and power loss. Such mass forces can be counteracted by a counteracting means operatively associated with means for connecting such forces to said vanes — in effect to substantially eliminate pressure of the vanes against the stator housing.

The generally sinusoidally-shaped annular surfaces of the side walls are finished to a surface which is parallel with an imaginary sinusoidal curve above its surface, and the parallel distance equals a radius formed on the sealing members thereby ensuing line contact, to seal over the breadth and on the circumference of the stator chambers and ensuing an exact sinusoidal movement of the vanes.

The vanes are equipped at all four sides with individual radially and axially slidably supporting sealing members which are pushed through mass forces against the stator housing for sealing engagement therewith; such mass forces are created by sealing pressure counterbalancing means located within the vanes and connected by means of levers to the sealing members. The sealing members themselves can create such mass forces.

For sealing in axial directions of the stator chambers, pretensioned sealing rings are non-rotably positioned in grooves within the inner and outer stator wall for radially sliding movement in contacting with a corresponding face of the rotor body for mutual sealing engagement, whereby the sealing diameter corresponds with the respective diameters of the inner and outer cylinder walls.

The vanes are mounted within the rotor body by vane supporting means comprising two side plates which are mutually connected by bolts or the like, which plates include an opening, in which said vanes being guided and supported for such axial movement. The vane supporting means include supply ports for lubricant and can support and include elements used for counteraction of the mass forces in the vanes.

With the foregoing in view, and such other or further purposes, advantages or novel features as may become apparent from consideration of this disclosure, the present invention consists of the inventive concept comprised, embodied, embraced or included in any method, process, construction, composition, arrangement or combination of parts, or new use of any of the foregoing which may herein be exemplified in one or more specific embodiments of such concept, reference being had to the accompanying drawings in which:

FIG. 4 is a fragmentary schematic view illustrating an induction or intake stroke of the engine of FIGS. 1 to 3;

FIG. 5 is a fragmentary schematic view similar to FIG. 4 but illustrating a compression stroke of the engine;

FIG. 6 is a fragmentary schematic view similar to FIGS. 4 and 5 but illustrating an expansion stroke of the engine;

FIG. 7 is a fragmentary schematic view similar to FIGS. 4 to 6 but illustrating an exhaust stroke of the engine;

FIG. 10 is a development similar to that of FIG. 3 but showing yet another construction of a rotary machine for operation as a four-stroke internal combustion engine;

FIG. 11 is a development of the machine of FIG. 10 at a subsequent stage in its operating cycle;

FIG. 12 is a transverse sectional view similar to FIG. 2 but taken through a rotary machine constructed for operation as illustrated in FIGS. 10 and 11;

FIG. 36 is a sectional view of a vane illustrating an axially acting sealing pressure counterbalancing means;

FIG. 37 is a front view of FIG. 36;

FIG. 38 is a sectional view of a vane illustrating a modified arrangement of sealing pressure means;

FIG. 39 is a transverse sectional view taken on line 39—39 of FIG. 26 illustrating radially acting sealing pressure counterbalancing means;

FIG. 40 is a front view of vane supporting means being mounted within the rotor body;

FIG. 41 is a side view of FIG. 40;

FIG. 42 is a top view of FIG. 40;

FIG. 43 illustrates schematically distributor means for ignition current; and

FIG. 44 is a schematic view similar to FIG. 43 illustrating a modified arrangement;

In the drawings, like characters of reference designate similar parts in the several Figures.

DESCRIPTION OF THE PREFERRED EMBODIMENTS

Figure 1:
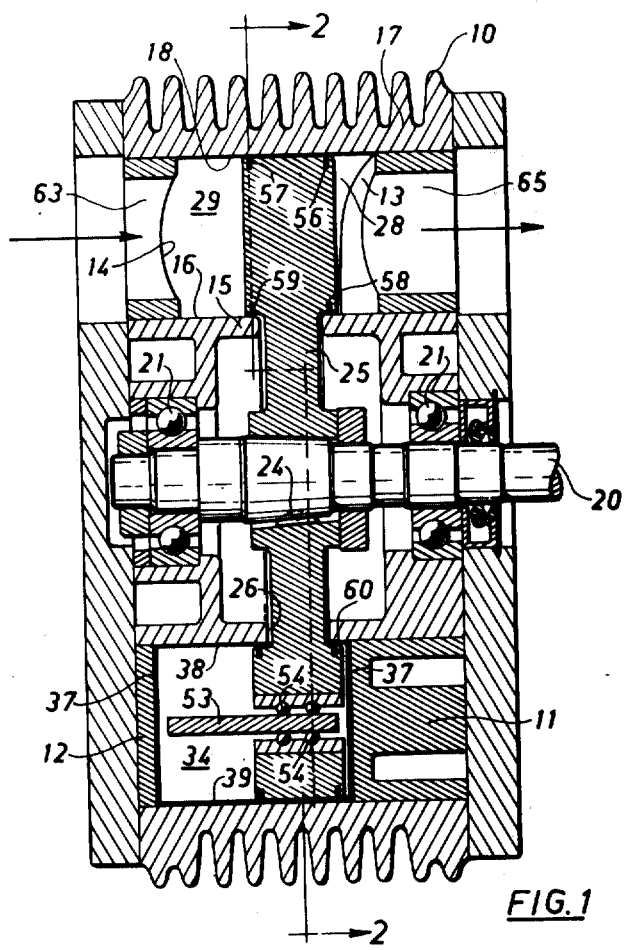
FIG. 1 is an axial sectional view through one embodiment of the present invention taken on the line 1—1 of FIG. 2.
Figure 2:
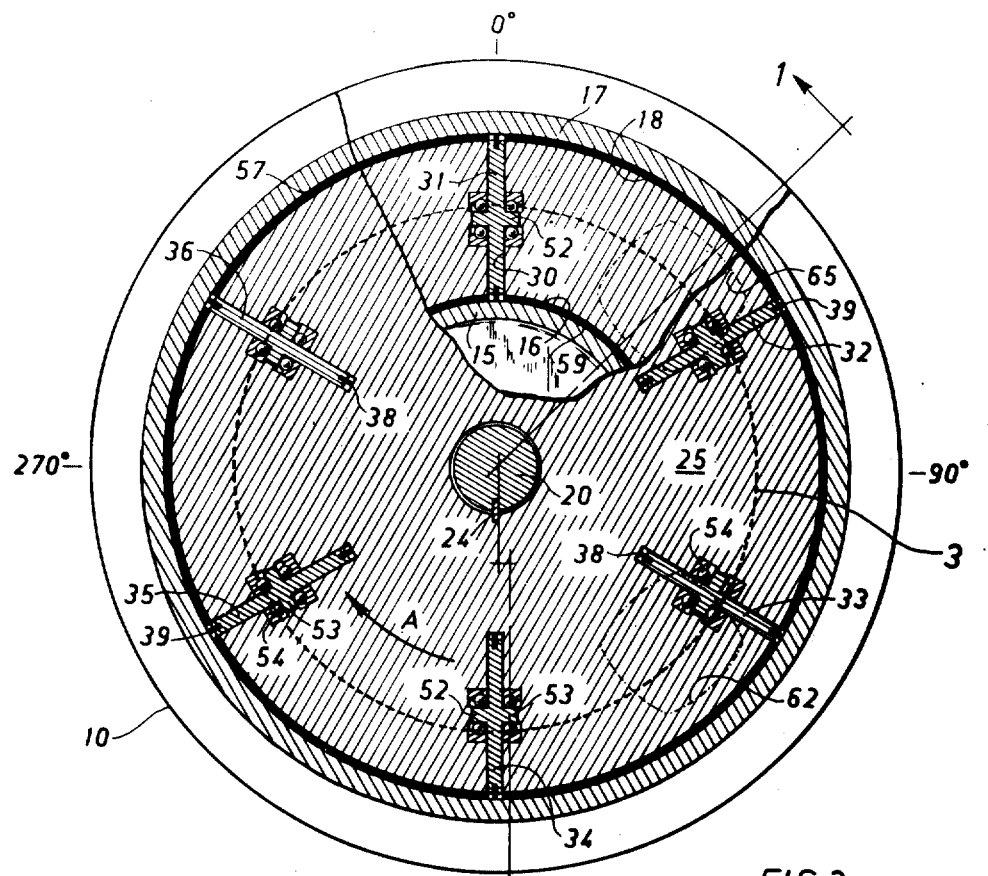
FIG. 2 is a transverse sectional view taken on the line 2—2 of FIG. 1.
Figure 3:
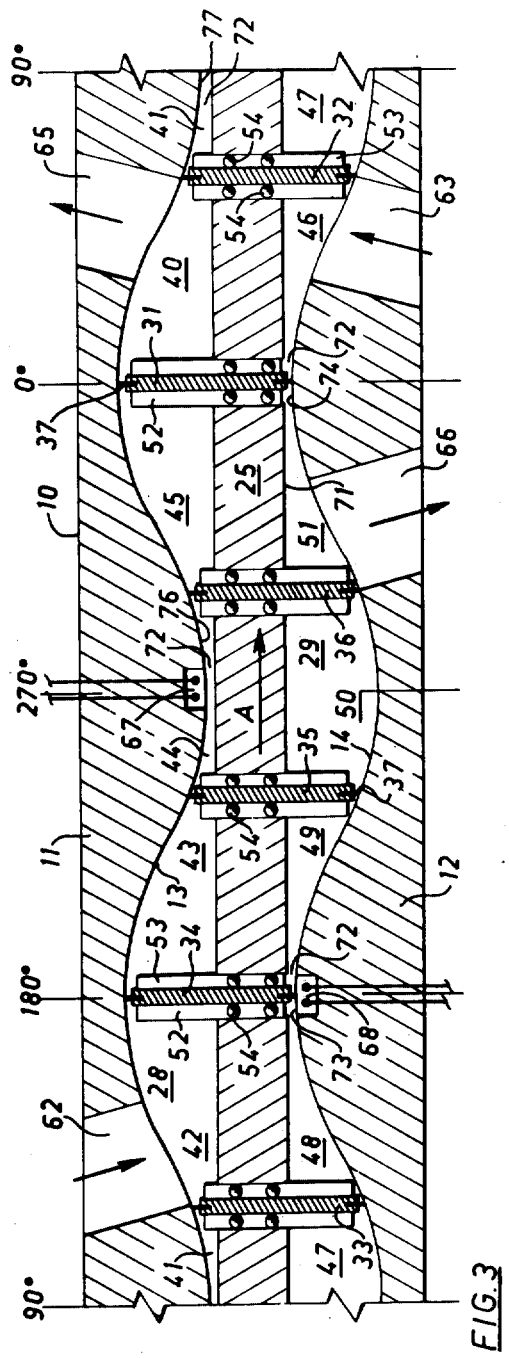
FIG. 3 is a development along the circle of FIG. 2 when viewed radially inwardly therefrom to illustrate the construction of the rotary machine of FIGS. 1 and 2 when used as a four-stroke internal combustion engine.

The rotary machine generally indicated at 10 in FIGS. 1 to 3 comprises a stator housing including side walls 11 and 12 with opposed inner surfaces 13 and 14 respectively having a substantially constant axial separation. An inner wall 15 having a cylindrical peripheral outer surface 16 extends between the side walls 11 and 12 as does an outer wall 17 having a cylindrical peripheral inner surface 18 parallel to surface 16 of wall 15 as well as to the axis of rotation of a rotor shaft 20 journalled in the stator housing by bearings generally indicated at 21. Walls 15 and 17 are suitably secured to the side walls 11 and 12.

Keyed to rotor shaft 20 at 24 for conjoint rotation therewith is a disc-like rotor body indicated at 25 and which extends through an annular opening 26 in the inner wall 15 and terminates at surface 18 of the outer wall 17. The rotor body 25 defines with the opposed annular surfaces 13 and 14 of the side walls 11 and 12 respectively, with surface 16 of the inner wall 15 and with surface 18 of the outer wall 17, first and second stator chambers generally indicated at 28 and 29 respectively, on opposite axial sides of the rotor body 25.

The side walls 11 and 12 are formed in their opposed surfaces 13 and 14 respectively with corresponding continuous and generally sinusoidal configurations extending in a direction parallel to the axis of the rotor shaft 20. The inner surfaces 13 and 14 are formed with two complete sinusoidal curves, although it is equally within the scope of this invention to provide each such surface with only one such curve or with many such curves.

The axial thickness of the rotor body 25 is such that it is axially spaced inwardly from the opposed surfaces 13 and 14 of the side walls 11 and 12 respectively at all angular positions about the shaft 20. Six vanes 31 to 36 extending between the sinusoidal annular surfaces 13 and 14 of the side walls 11 and 12 respectively as well as between surface 16 of the inner wall 15 and surface 18 of the outer wall 17 are axially movably supported in radially and axially extending slots 30 in the rotor body 25. At their axially outer ends, vanes 31 to 36 are provided with resilient seals 37 for sealing and sliding engagement with the surfaces 13 and 14. The rotor body 25 has an axial thickness sufficient to support the vanes 31 to 36, and the thickness of the vanes should be small but sufficient for operation under fluid pressure, as low weight of the vane results in low mass forces during operation. Resilient sealing members 38 and 39 are also provided for sliding sealing engagement with surface 16 of the wall 15 and with surface 18 of the wall 17. Vanes 31 to 36 divide each of the stator chambers 28 and 29 into six mutually isolated compartments 40 to 45 and 46 to 51 respectively. The vanes 31 to 36 also prevent the passage of fluid material between the stator chambers 28 and 29 through the slots 30.

With shaft 20 and rotor body 25 conjointly rotating as indicated by the arrows A in FIGS. 2 and 3, the sealing members 39 will be subjected to considerable radial compression due to the centrifugal forces generated during such rotation.

To avoid excessive compression and wear of such sealing members and to limit the frictional resistance opposing their movement along the surface 18, each of the vanes 31 to 36 is provided along its faces with axially extending bearing arms 52 and 53 supported in the respective slots 30 in the rotor body 25 by ball bearings 54 which thus limit radially outward movement of the vanes.

To prevent the passage of fluid between the stator chambers 28 and 29 past the radially outer edge of the rotor body 25, axially spaced apart and peripheral resilient sealing members 56 and 57 are provided. Similar sealing members 58 and 59 are provided in radially inwardly facing shoulders 60 for sealing engagement with the surface 16 of wall 15 on each axial side of the opening 26.

The machine 10 also includes a first fluid inlet passage 62 extending through the side wall 11 for the sequential supply of fluid material to the compartments 40 to 45 of first stator chamber 28 while a second fluid inlet passage 63 extends through the side wall 12 for the sequential supply of fluid material to the compartments 46 to 51 of second stator chamber 29.

First and second fluid discharge passages 65 and 66 extend through the side walls 11 and 12 respectively for the sequential discharge of fluid material from compartments 40 to 45 and 46 to 51 on rotation of the rotor body 25.

The machine 10 is shown in FIGS. 3 to 7 as being operated as a double-acting four-stroke internal combustion engine, for which operation it is also provided with first and second spark plugs 67 and 68 energized and controlled by an ignition control means (not shown). The machine 10 is also provided with suitable cooling and lubrication means. Since the invention is in no way restricted to the use of any particular means for providing such auxiliary features, such means will not, however, be described in greater detail herein.

The stator chambers 28 and 29 (FIG. 3) on opposite axial sides of the rotor body 25 function independently in four-stroke cycles, operation of the two chambers being mutually out of phase. A combustible fuel/air mixture is supplied to such compartments continuously through inlet passages 62 and 63 (FIGS. 3 and 4) from any suitable carburetion system (not shown). Rotation of the rotor body 25 as indicated by the arrow A causes compression of the fuel/air mixture contained within the compartments (FIG. 5). When such compression is complete and the centre of the appropriate compartments are near appropriate ones of spark plugs 67 and 68 (FIG. 6), those spark plugs are operated to cause ignition and combustion of the compressed fuel/air mixture. The difference in the exposed areas of the vanes containing such combusting mixture causes a driving couple to be applied to the rotor body 25. Reduction in the volume of the compartments with exhaust of the combustion gases through the exhaust passages 65 and 66 then takes place (FIG. 7). It is important to note that axial clearances or gaps 72 are provided between the axial side surface 71 of the rotor body 25 and the crests 73 and 74 of the side wall 12. Similar spaces are provided between the opposite side surface of the rotor body 25 and the crests 76 and 77 of side wall 11. These gaps provide for the minimum chamber volume and define the compression ratio of the individual compartments. A gap or an interconnection consisting of a hollow side surface of the rotor body is required between the two pockets near the vanes to maintain the unity of each such compartment.

During operation of the engine 10, fresh fuel-air mixture will be inducted into the engine compartments sequentially for compression, ignition, expansion and exhaust from the compartments. It will now be understood that six complete operating cycles will occur for each of the stator chambers 28 and 29 for each rotation of the rotor body 25, such operating cycles being angularly spaced apart to an extent of 60° and the chamber 28 is 30° angularly spaced apart from chamber 29, whereby 12 operating cycles, 30° angularly spaced apart and alternatively on both axial sides of the rotor body 25 occur on each complete rotation of the rotor body 25.

Many modifications can be made in the structure shown in FIGS. 1 to 7 without departing from the scope of the invention. For example, the inlet and outlet passages 62, 63 and 65, 66 respectively can be formed in the outer wall 17 instead of in the side walls 11 and 12 and such side walls can be formed with more than two complete sinusoidal curves. If a larger even number of such curves is provided on the side walls, a corresponding number of four-stroke cycles can be obtained on each side of the rotor body for each complete revolution.

It is also possible to construct a machine similar to that already described but with only one of the stator chambers 28 and 29 being intended to be operated as a four-stroke engine, the other chamber then being operated in a different manner, for example, as a fluid pump.

With three or a higher odd number of sinusoidal curves on the side walls 11 and 12, one such complete curve on one or both side walls can then be utilized for supercharging the engine with a fuel/air mixture for subsequent combustion of that mixture during ensuing four-stroke operation.

It is also possible to vary the number of vanes provided in the engine. With two complete sinusoidal curves on each of the side walls 11 and 12, it is necessary, for obtaining the described four-stroke operation, to provide a minimum of four axially reciprocating vanes, it is best feasible, however, to incorporate six vanes to obtain sufficient compression ratio. Only the number of vanes determine the maximum possible compression ratio, whereas the amplitude of the sinusoidal curve is of no influence.

For better operation of the rotary machines, further features are incorporated. For example, the sealing members 37 contacting the surfaces 13 and 14 will be subjected to considerable axial compression due to the axial acceleration and deceleration forces generated during the rotation of rotor body 25, similar to the radial compression of the sealing members 39 contacting surface 18.

To avoid compression and frictional resistance of the sealing members 37 and 39, each vane 31 to 36, instead of being provided with axially extending bearing arms 52 and 53 is connected to means which counteract and effect compensation of the axial and radial mass-forces. A group of counteracting means can be used comprising reacting, counterbalancing, centrifugal, pneumatic, hydraulic or electromagnetic assemblies. Such counteracting assembly is fastened substantially to the centre of each vane and, for example, mounted parallel to the vane movement or at right angles thereto as for example like a leaf spring.

Figure 22:
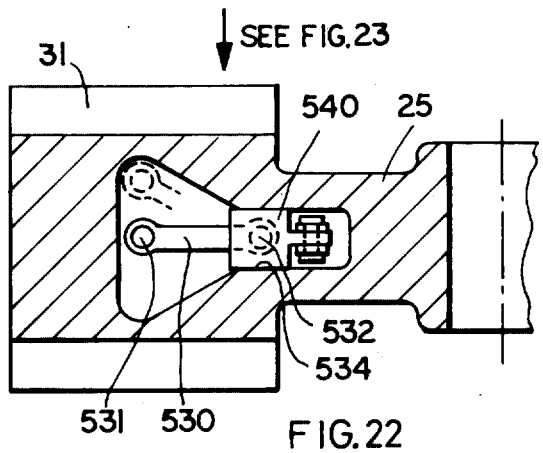
FIG. 22 is an axial section view of the rotor body taken on line 22 of FIG. 23 illustrating an elongated element and radially acting guide means.
Figure 23:
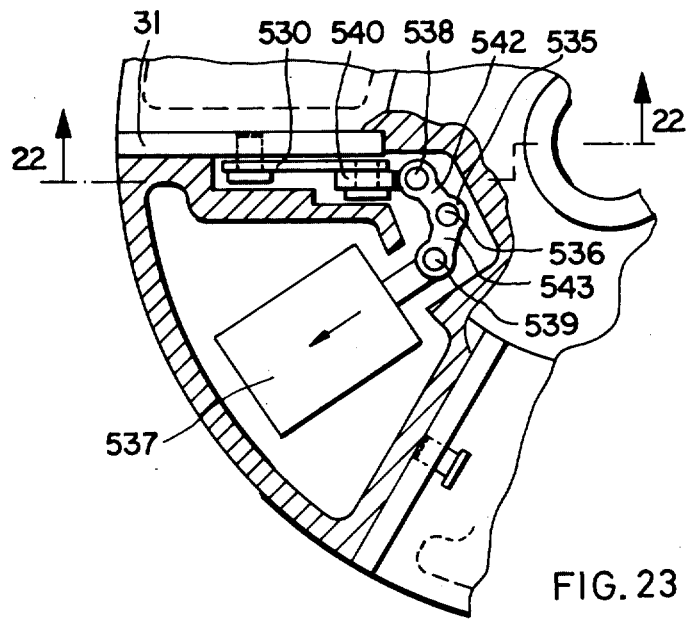
FIG. 23 is a transverse sectional view taken in direction of arrow 23 of FIG. 22 showing a two-armed lever having additional angular disposition of its arms and illustrating counterbalancing means.

In a modified arrangement, the counteracting means include generally radially acting guide means connected to a vane by an elongated element. The elongated element, such as an arm, or string, or wire, is at opposite ends fastened pivotally substantially to the centre of each vane and to the radially acting guide means as shown in FIGS. 22 and 23.

At a given speed the radial mass-forces in the vanes are constant. The axial forces are zero at axial centre position of the vanes. At an axially extended position, the axial mass-forces equal the distance of the vane from the centre line, when the amplitude represents the maximum axial mass-force, which is defined by the height of the sinusoidal curve of the side walls. The counteracting forces should be in synchronization with the mass-forces in said vanes in all axial positions of said vanes and at all speeds of said rotary machine. The force variation of the counteracting means will have an exponential curve characteristic. The synchronization at all axial positions of the vanes is effected by the axial movement of said vanes. To effect synchronization at all speeds, an increased pretension is applied with increased speed, for example (i) an increased pressure supply to a pneumatic assembly, for (ii) the counteracting means include a pressure exerting assembly selected from the group of reacting, counterbalancing, centrifugal, pneumatic, hydraulic or electromagnetic assemblies. The pressure exerting assembly is directly or indirectly connected by means such as a lever element or a string or wire, to the counteracting means to co-operate therewith. If required, the pressure exerting assembly may include conventional frequency damper means for substantial elimination of sinusoidal frequencies of the vanes for said pressure exerting assembly.

Figure 19:
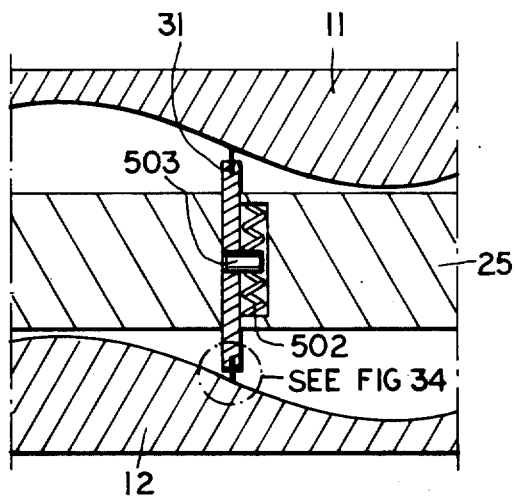
FIG. 19 is a fragmentary development view showing counteracting means connected to a vane parallel to the vane movement.

FIG. 19 shows a counteracting means 502 mounted parallel to the vane movement within the rotor body 25. The counteracting means are connected by pin 503 to vane 31, which is contained between the side walls 11 and 12 respectively, and supported in the rotor body 25 for axial sliding movement.

Figure 20:
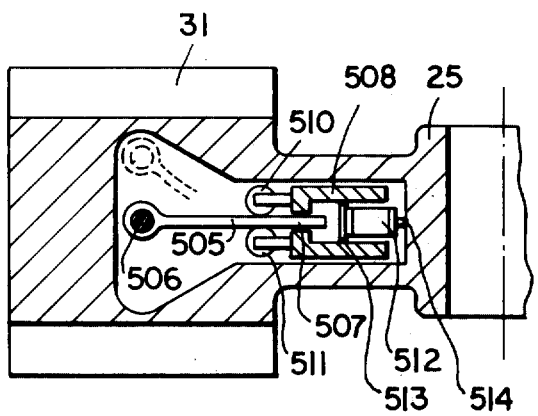
FIG. 20 is an axial sectional view of the rotor body showing counteracting means mounted rectangularly to the vane movement and indicating a pressure exerting assembly and a frequency damper means.

FIG. 20 demonstrates another way of mounting a counteracting means: A leaf spring 505 is mounted rectangularly to the vane movement and connected to the vane 31 at 506 and at the opposite end at 507 being axially stationarily supported within the rotor body 25. A pressure exerting assembly 508 supported within the rotor body for radial movement is connected to said counteracting means 505 by pins or rollers 510 and 511 shortening the length of the counteracting means with increased speed and thereby increasing the counter force. A frequency damper means 512 is mounted between the pressure exerting assembly 508 at 513 and a stationary point 514 within the rotor body. The frequency damper means 512 is designed to avoid sinusoidal frequencies of the vanes.

Figure 21:
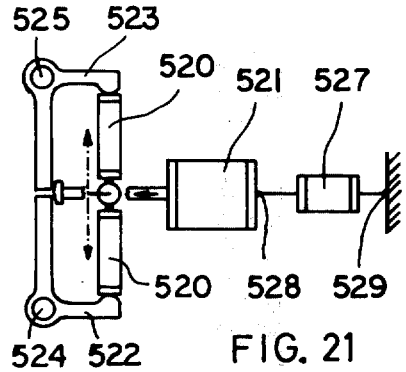
FIG. 21 is a schematic view of counteracting means combined with a pressure exerting assembly and frequency damper means.

FIG. 21 is a schematic view showing counteracting means 520 combined with a pressure exerting assembly 521 connected by two-armed levers 522 and 523 to the counteracting means. The two-armed levers 522 and 523 are pivotally supported at 524 and 525 respectively within the rotor body. If the pressure exerting assembly 521 comprises, for example, a counterbalance, a frequency damper 527 is connected between the pressure exerting assembly at 528 and the rotor body at 529. If the pressure exerting assembly 521 comprises, for example, a hydraulic assembly, said hydraulic assembly is connected directly to the rotor body at 529 without the frequency damper means 527 the counteracting means 520 consisting of a reacting assembly such as a spiral spring, counteracts the axial acceleration and deceleration forces of the vane. With increasing speed, the axial mass force of the vane is also increased, whereby said counteracting means 520 are pretensioned by a pressure exerting assembly 521. 521 is a reacting assembly, and which exerts force via two-armed levers 522 and 523 to counteracting means 520.

FIGS. 22 and 23 show a modified arrangement where the counteracting means include an elongated element 530 connected between a vane and the radially acting guide means 540 located generally at the axial centre within the rotor body. A radially directed force applied to the elongated element at the radially acting guide means counteracts the axial and radial mass forces in said vanes. The length of said elongated element 530 determines its angle at totally extended vane position which should be selected to equal the angle of the resultant force of the mass forces in said vanes.

FIGS. 22 and 23 show an arm 530 pivotally adapted by pin 531 substantially to the centre of a vane 31 said arm extends generally inwardly and is at opposite end pivotally connected by pin 532 to sliding block 540, which is guided in respective recesses 534 within the rotor body 25. A two-armed lever 535 is pivotally supported by pin 536 within rotor body 25 and lever 535 is at both ends pivotally connected to the counteracting means 537 and to the sliding block 540 by pins 538 and 539 respectively. Further arms or a string or wire can be incorporated between ends of lever 535 and the counteracting means 537 and sliding block 540 respectively. The counterbalance 537 is suitably guided for generally radially movement.

The synchronization of the counteracting forces to the mass forces in the vanes in respect to all axial positions can also be obtained by a lever element: As shown in FIG. 23, the two arms of lever 535 extend at an angle greater than the generally 180° of the force reversal measured outside of the force applications. The additional angular dispositions between said arms 542 and 543 is about up to 70° and approximately corresponds with the movement. During operation the acting lever arms vary inversely thereby synchronizing the counteracting force to the mass force in said vanes. Such two-armed levers can be used for any degree in deflexion of the force direction. For linear force transmission the two arms are about up to 70° angularly disposed; for a 90° directional change the angular disposition is about up to 160°.

The use of a one-armed lever has the same effect. At one end it is pivotally supported, while to its other end both forces are pivotally connected. A one-armed lever, however, is more effective only near a 90° force deflexion, but two such levers make up for reversal of the force direction.

Such a lever element causes radial movement of the counteracting means, whereby further acceleration and deceleration forces vary the counteracting force oppositely as desired, and these additional forces are to be taken into account for the synchronizing effect of the lever element.

The location of the counteracting means can be within the rotor body next to the vanes or generally opposite, or be outside the rotor body within separate guide means including a string, or wire, for force transmission.

Figure 24:
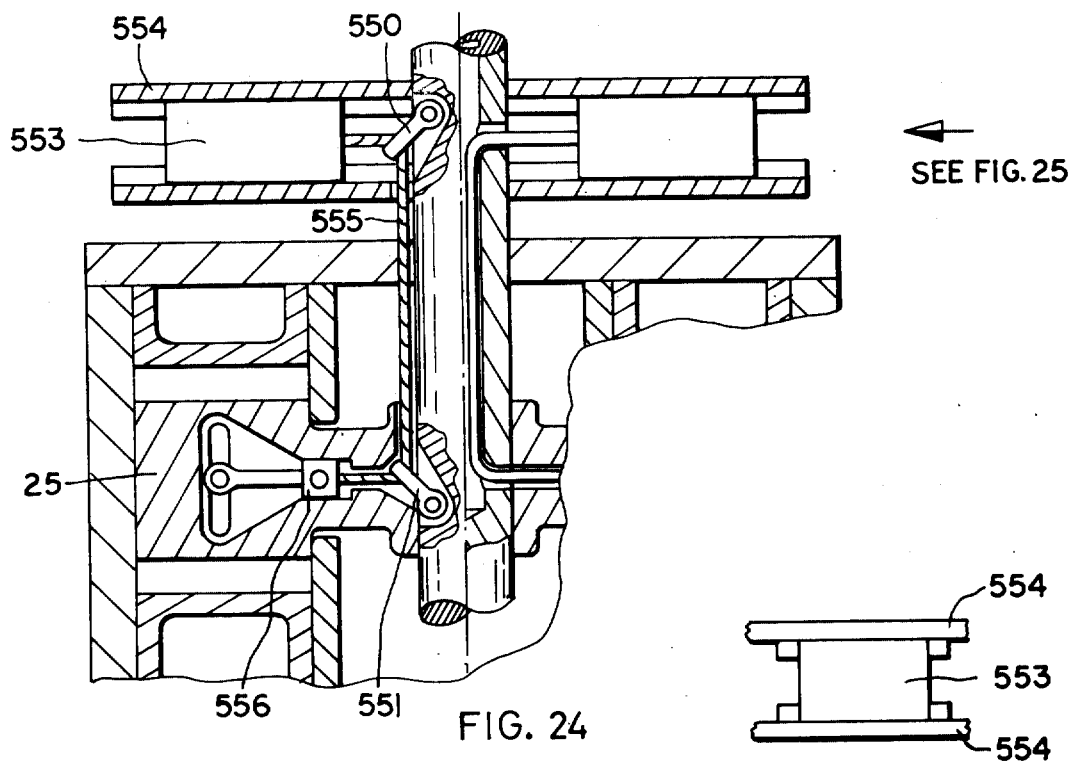
FIG. 24 is an axial sectional view through one embodiment of the invention demonstrating the use of one-armed levers and generally outside of the rotor body located counteracting means.
Figure 25:
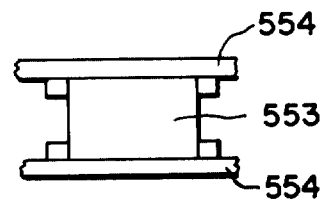
FIG. 25 is a fragmentary view of the counteracting means taken in direction of arrow 25 of FIG. 24.

FIG. 24 indicates the use of two one-armed levers 550 and 551 in combination with a counteracting means 553 located outside of the rotor body within separate guide means 554 for co-rotation with rotor body 25. A string or wire 555 interconnects the counteracting means via the levers 550 and 551 with sliding block 556. A counterbalance 553 in the form of counteracting means is radially movably guided by guide means as shown in FIG. 25. If instead of a lever assembly a reacting assembly is being used, only one pressure exerting assembly is required to co-operate with the reacting assemblies for all vanes.

Figure 26:
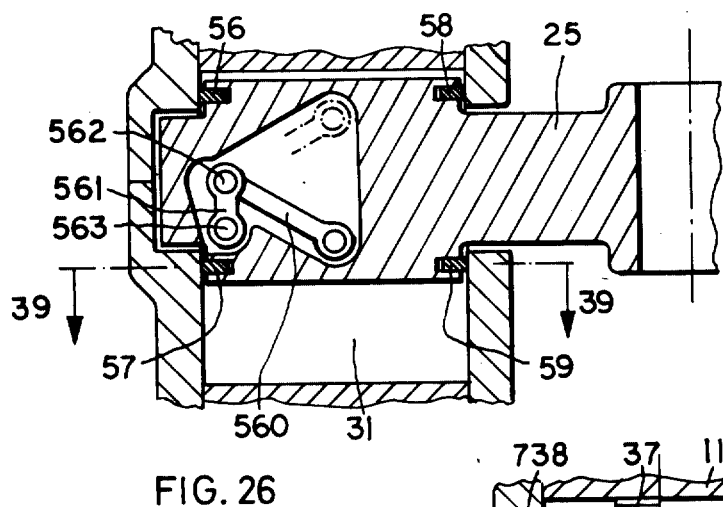
FIG. 26 is an axial sectional view of the rotor body showing another arrangement of radially acting guide means and a generally outwardly directed elongated element.

FIG. 26 demonstrates an elongated element 560 pivotally connected to a vane 31 and extending generally radially outwardly to be connected to a radially acting guide means. Said guide means comprises alternatively a pressure and tension element 561 at one end pivotally connected by pin 562 to the elongated element 560 and at opposite end pivotally supported by pin 563 within rotor body 25 at such position that the pressure and tension element 561 will be parallel to the vane movement when said vane 31 is at extreme extended positions. A generally outwardly directed force applied to the elongated element 560 at 562 counteracts the axial mass forces in said vanes.

The radially acting guide means can also comprise a simple slot within the rotor body 25 co-operatively associated with a pin; or, if the elongated element (530, 560) pivotally connected to a vane comprises a string or wire 555, said string or wire can extend through a bore in the rotor body 25 to be connected to a counteracting means. The bore will be at the axial centre and includes rounded endings.

Figure 27:
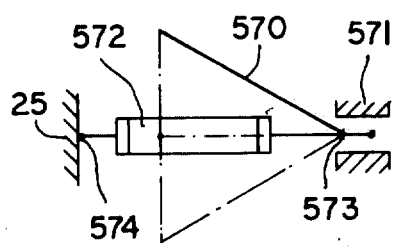
FIG. 27 to FIG. 33 are schematic views illustrating various installation possibilities of counteracting means including an elongated element connected for axial and radial movement at opposite ends.
Figure 33:
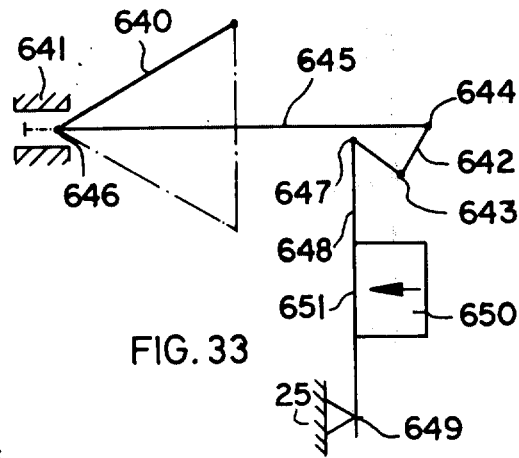

FIGS. 27 and 33 indicate schematically various installations to the counteracting means including an elongated element pivotally connected substantially to the centre of a vane.

FIG. 27 shows an elongated element 570 extending generally inwardly from the vane and at opposite ends connected to the radially acting guide means 571 within the rotor body 25. A counteracting means 572 is also connected thereto at 573 and mounted in line with the radial movement of the guide means. The counteracting means is at opposite end connected to the rotor body at 574.

Figure 28:
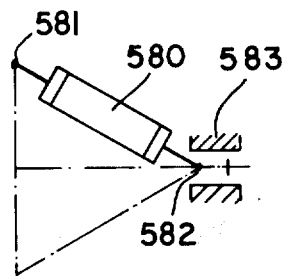

FIG. 28 indicates the use of a counteracting means 580 replacing the elongated element. The counteracting means 580 is pivotally connected substantially at the centre of a vane at 581 and at opposite end at 582 connected to the rotor body 25. If the counteracting means requires a pressure exerting assembly, the counteracting means is at said opposite end at 582 connected to radially acting guide means 583 within the rotor body 25 to which a pressure exerting assembly is adapted to co-operate therewith.

Figure 29:
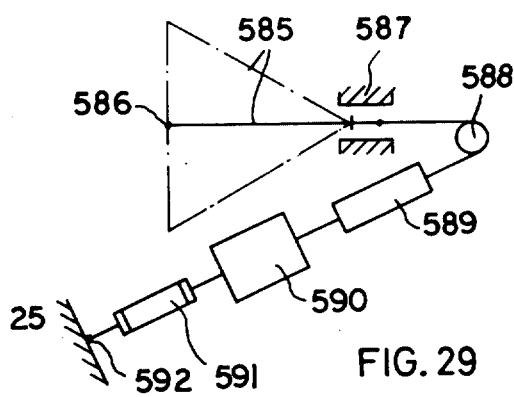

FIG. 29 shows a string or wire 585 connected substantially to the centre of a vane at 586 and extending radially inwardly via radially acting guide means 587 and via a deflexion pin or pulley 588 to a counteracting means 589 being adapted thereto. The counteracting means 589 is connected to a pressure exerting assembly 590 which is further connected to a frequency damper means 591 connected at 592 to the rotor body 25.

Figure 30:
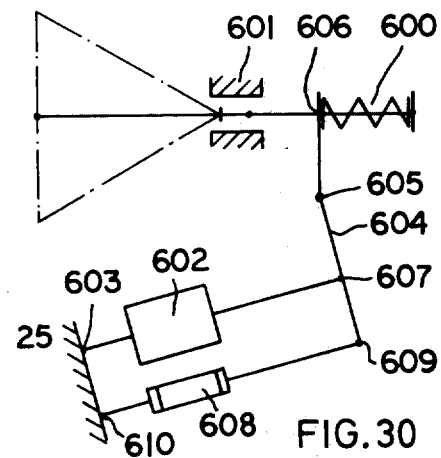

FIG. 30 demonstrates a counteracting means 600 mounted in line with the movement of the radial acting guide means 601 but at opposite side as shown in FIG. 27. The counteracting means 600 include a pressure exerting assembly 602, for example, a counterbalance or hydraulic assembly, which is adapted to the rotor body at 603 and to the counteracting means 600 via a two-armed lever 604 acting essentially for force reversal. Said lever 604 is at its centre 605 pivotally supported in the rotor body 25 and at both ends connected to the counteracting means 600 at 606 and to the pressure exerting assembly 602 at 607 respectively. If needed, a frequency damper means 608 is connected between the lever 604 at 609 and the rotor body 25 at 610.

Figure 31:
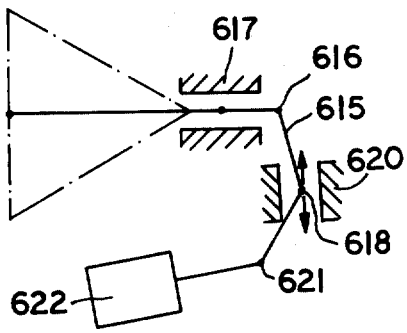

FIG. 31 shows a two-armed lever 615 having additional angular disposition of its arms for synchronization of the forces. Said lever is at one end at 616 connected to the radially acting guide means 617 for general radial movement. The lever 615 is at its centre 618 pivotally and tangently movably supported by guide means 620, and the lever is at opposite end 621 connected to the counteracting means 622.

Figure 32:
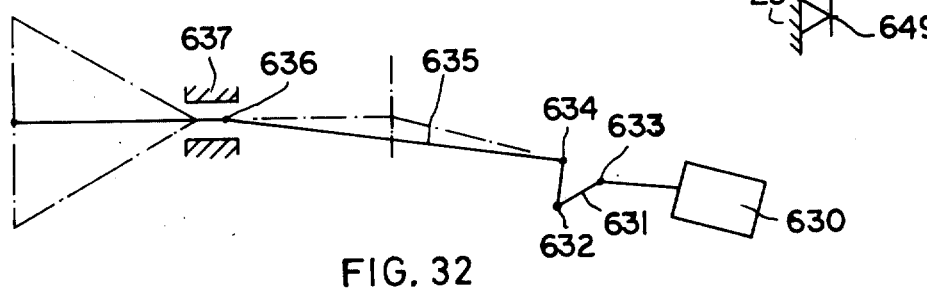

FIG. 32 shows within the rotor body 25 generally opposite located counteracting means 630 combined with a two-armed lever 631 for force synchronization and for in-line force transmission. The two-armed lever is at 632 pivotally supported within the rotor body, and one arm is at 633 connected to the counteracting means 630 and the other arm is at 634 connected to a string or wire 635 which extends through rotor body 25 and is connected at 636 to the radially acting guide means 637.

FIG. 33 indicates an elongated element 640 extending radially outwardly from the vane and connected to radial acting guide means 641. A two-armed lever 642 for linear force transmission, which arms extend up to about 90°, is at its centre 643 pivotally supported within rotor body 25; one arm is at 644 pivotally connected to a pressure and tension element 645, which other end 646 is connected to the radial acting guide means 641; the other arm is pivotally connected at 647 to a second-class lever 648, which other end is tangently movably supported within rotor body 25 at 649. A counterbalance 650 acts upon the second-class lever 648 at 651. This arrangement decreases the radial travel of the counterbalance which in turn decreases its additional mass forces; for a generally inwardly directed counterforce a two-armed lever with unequal length of the lever arms is being used.

The final geometry of the surfaces 13 and 14 of the side walls 11 and 12 and their contacting sealing members 37 is as follows:

The annular surfaces 13 and 14 will be finished by a tool of small diameter, preferably a grinder. The centre line of the tool is guided along the side walls 11 and 12 at an exact sinusoidal configuration 655 (FIG. 34), while finishing the surface. The radius of the tool comprises a measurement from about 0.5% to 5% of the diameter of the inner surface 18 of the outer stator wall 17 (see FIGS. 1 to 3).

Figure 34:
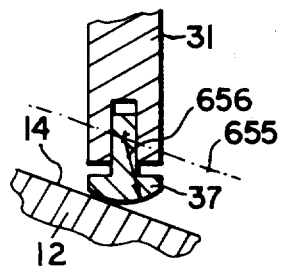
FIG. 34 is an enlarged view taken from FIG. 19 as indicated by arrow 34 showing the contacting radius of the sealing member with the annular side walls.

The annular surfaces 13 and 14 are not strictly sinusoidally shaped, but have a surface which is parallel with an imaginary sinusoidal curve above said surface. The sealing members 37 of vanes 31 to 36 have a radius 656 as shown in FIG. 34, equal to said parallel distance between the surface of said side walls and said imaginary sinusoidal curve 655 whereby on rotation of the rotor body 25 the sealing members 37 describe an exact sinusoidal configuration and maintain a line contact over the full breadth and at the total circumference of the side walls 11 and 12 with surfaces 12 and 13. The contact radius between sealing members 37 and the annular surfaces 13 and 14 can be constant or be varying over the breadth of stator chambers 28 and 29. Such radius variation is preferably linearly increasing with the distances to the centre of rotation of the rotary machine. Generally, the contacting radius should be as large as possible to increase the wearing area of the sealing member 37 and to facilitate the finishing process of the annular surfaces 13 and 14 by the use of a larger tool. The radius is limited by the width of the sealing member 37 together with the maximum angle of circumferential incline of the sinusoidally-shaped annular surfaces 13 and 14.

FIG. 36 to FIG. 39 indicate the application of sealing pressure counterbalancing means to create sealing pressure. FIGS. 36 and 37 illustrate counterbalancing means 680 acting on the axial sealing members 37 of the vanes 31 to 36 contacting the annular surfaces 13 and 14 of side walls 11 and 12. A two-armed lever 681 is pivotally connected at 682 within recess 683 of the vane 31, the counterbalance 680 positioned in recess 685 contacts first arm 686 of lever 681 which second arm 687 contacts sealing member 37. On rotation of rotor body 25 centrifugal energy forces the counterbalance 680 in direction of arrow 688 whereby sealing member 37 is forced for separation with vane 31.

In FIG. 38 a modified arrangement of a one-armed lever 690 extends from a recess 691 within vane 31 to a recess 692 within sealing member 37. On rotation of the rotor body 25 the sealing member 37 acting as a counterbalance is forced by lever 690 for axial separation.

The radial sealing members 38 and 39 of vanes 31 to 36 contacting the surfaces 16 and 18 of inner and outer walls 15 and 17 respectively can also include such sealing pressure counterbalancing means connected to create seal pressure. A similar arrangement of counterbalancing means acts upon sealing members 58, 59, and 56, 57, contacting surfaces 16 and 18 respectively, as shown in FIG. 39. A two-armed lever 702 is pivotally connected by pin 703 in rotor body 25 in respective recess 704; a sealing pressure counterbalancing means 706 positioned in recess 707 is connected by means 709 to one arm of lever 702, which other arm contacts sealing member 59. Another lever 712 is pivotally connected by pin 713 in rotor body 25 in respective recess 714, a counterbalance 716 positioned in recess 717 is connected by means 719 to lever 712 which contacts sealing member 57. This function will be readily apparent, as on rotation of rotor body 25 centrifugal mass forces of counterbalancing means 706 and 716 act on the sealing members 59 and 57 respectively.

Figure 35:
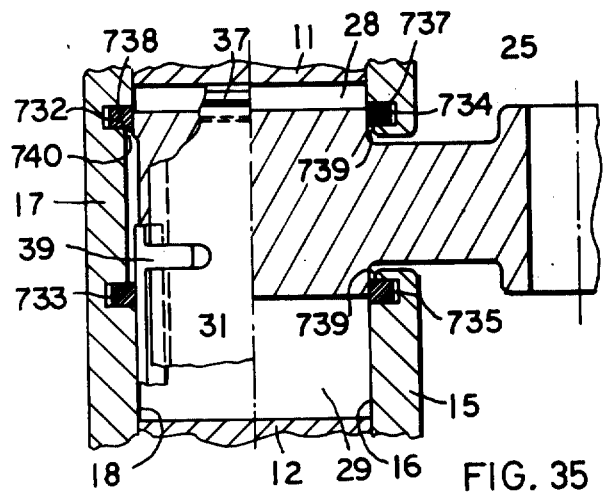
FIG. 35 is another axial sectional view through the rotor body showing axially acting sealing rings mounted within the stator walls.

As illustrated in FIG. 35 the sealing of the stator chambers 28 and 29 in axial direction past the rotor body 25 can be achieved by sealing rings 732, 733, 734 and 735 which are non-rotably positioned in the inner stator wall 15 and outer stator wall 17 respectively. The inner rings 734 and 735 having outwardly directed pretension and rings 732 and 733 having inwardly directed pretension and are radially slidably supported in the stator walls within respective recesses and are positioned to project out beyond the thickness of the rotor body 25. The rings 732, 733, 734 and 735 bear sealably against a corresponding sealing face 737 and 738 of the rotor body 25. A radial clearance is provided between the stator walls 15 and 17 with the rotor body 25 as indicated at 739 and 740. The diameter of sealing faces 737 and 738 of rotor body 25 correspond with the diameter of surfaces 16 and 18 of inner and outer stator walls respectively, whereby the sealing rings 732, 733, 734 and 735 seal simultaneously with the sealing members 38 and 39 of vanes 31 to 36.

For proper guidance of the vanes 31 to 36 the rotor body 25 includes vane supporting means generally indicated at 750 in FIGS. 40 to 42. Two side plates 752 and 753 extending radially between the inner and outer stator walls 15 and 17 are of the same thickness as the rotor body 25 and also of sufficient thickness substantially to maintain their geometrical form under operating conditions. The side plates also include mounting means 754 and 755 extending radially inwardly and outwardly from the plates 752 and 753 and are thinner than the rotor body to allow space for axial sealing members 732 to 735 between the plates 752 and 753 and the inner and outer stator walls 15 and 17 respectively. The side plates 752 and 753 are mutually connected at a distance apart corresponding with the vane thickness by means of bolts or the like and by the mounting means 754 and 755 which include a spacer 757. The mounting means 754 and 755 are of sufficient radial extension to permit of mutual connection. The vane supporting means 750 are positioned within corresponding slots 758 within the rotor body 25, essentially to prevent axial fluid bypass and fastened therein by key rings 760 and 761 at axial sides of the rotor body 25. Keys 763 and 764 correspond with recesses 765 and 766 at axial sides of the mounting means 754. The key rings are fastened to the rotor body by bolts or the like. The vanes 31 to 36 are supported and guided within the vane supporting means 750 for axial sliding movement but essentially to prevent fluid passage therethrough. The function of the vane mounting means is now apparent: As the plates 752 and 753 can be made of special material or the vane guiding surfaces can be specially coated for high wear resistance, the vanes themselves can receive such high wear resistant coating. Means for supply of a lubricant can be incorporated ensuing low friction and long life guidance for the vanes. The wider slot 758 required for the vane supporting means compared to the vane thickness provides for easier machining of the receiving slots in the rotor body 25. One plate of the vane supporting means can include lever means used for counteracting the mass forces of the vanes.

In a modification, the slot in which said vanes are guided and supported may be logged out from one plate thereby avoiding means for interconnecting two side plates.

In another modified arrangement the two side plates are individually connected to the rotor body, whereby the rotor body includes a spacer and connecting means 767 and 768 at the radial outer edges by which they are held at a substantially invariable distance apart under operating conditions to maintain a proper guidance for the vanes.

In still another modification the side plates include antifriction bearings for rolling contact of said vanes.

Generally indicated at 770 and 790 (FIGS. 43 and 44) the rotary machine further includes means for distribution of ignition current which means comprise a distribution housing 771 (FIG. 43) of current insulating material including two receiver points 772 and 773 of current conducting material angularly 90° disposed and positioned for mutual inner contact diameter. A distributor rotor means 774 is rotably mounted within the housing 771 for corresponding rotation with the rotor body 25 including six distributor points 775 to 780 of current conducting material equiangular disposed and terminating at a diameter corresponding with the inner contact diameter of the receiver points 772 and 773 for intermittent electrical contact therewith on rotation of the rotor means 774. The distributor rotor means 774 includes a connecting point 781 at its centre, to which intermittent electrical current is supplied and which is of current conducting material and electrically connected to the distributor points 775 to 780. The distributor rotor means includes insulation against current flow other than through the distributor points 775 to 780.

An alternative arrangement 790 (FIG. 44) has two receiver points 792 and 793 angularly 180° disposed within the distributor housing 791, and the distributor rotor means 794 including three distributor points 795 to 797, and connecting point 798, is mounted for double rotating speed with reference to rotor body 25.

On rotation of the rotor means 794 and supply of intermittent ignition current to connecting point 798, the ignition current is alternatively distributed to receiver points 792 and 793 which are individually connected to individual ones of the ignition means 67 and 68 in stator chambers 28 and 29 for supply of said ignition current. The distributor means 770 requires 12 ignition impulses per revolution of rotor means 774, while the distributor means 790 requires only six such ignition impulses per revolution of its rotor means 794. Other rotating speeds of the distributor rotor means 774 and 794 are constructively possible, whereby the angular disposition of receiver points and the number of distributor points is such to conform with said rotating speed.

Figure 18:
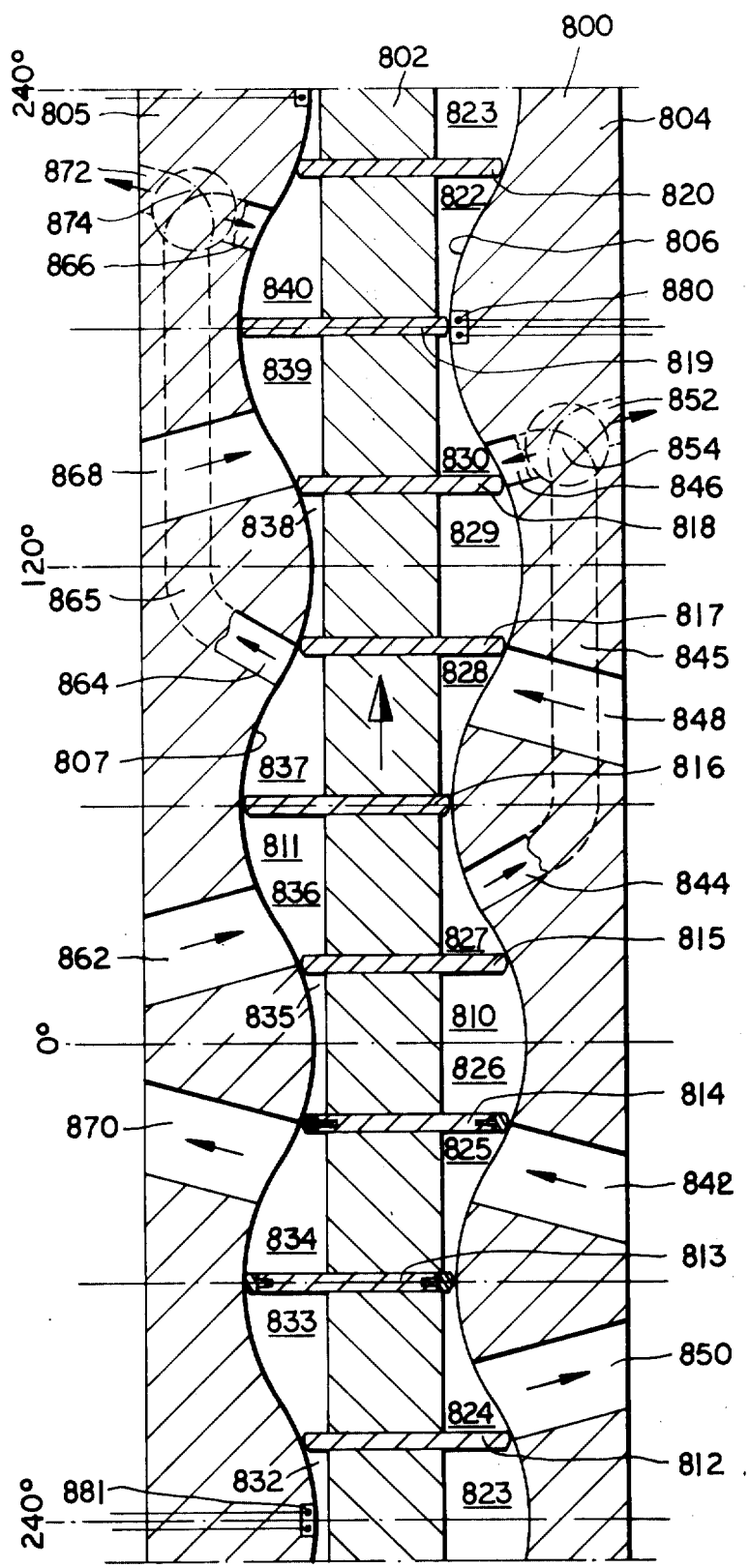
FIG. 18 is a development view similar to FIG. 3 but illustrating the three-curve version of the invention.

The engine generally indicated at 800 in FIG. 18 is intended to operate as a supercharged four-stroke engine on both axial sides of a rotor body 802. It includes axially spaced apart side walls 804 and 805 with opposed and axially spaced apart annular surfaces 806 and 807 respectively, each formed with three complete and generally sinusoidal configurations. Rotor body 802 journalled in the stator housing defines with the surfaces 806 and 807 respectively, two continuous stator chambers 810 and 811 on opposite sides of the rotor body 802. A plurality, preferably nine, reciprocable vanes 812 to 820 are axially movably supported in the rotor body 802 for axial end abutment with surfaces 806 and 807 to divide each of the stator chambers 810 and 811 into individual compartments 822 to 830 and 832 to 840 respectively.

The engine 800 also includes an intake passage 842 for the induction of a combustible fuel/air mixture sequentially into the compartments 822 to 830 of the stator chamber 810, a discharge passage 844 in the side wall 804 being in fluid communication through a transfer passage 845, formed in the side wall 804, or outside the stator housing, with an intake passage 846 for sequential supply to the compartments 822 to 830 of the stator chamber 810, a further inlet passage 848 for sequential induction of a combustible fuel/air mixture into the compartments 822 to 830. A discharge passage 850 extends through the side wall 804 for discharge of fluid material sequentially from the compartments 822 to 830.

From the transfer passage 845 a discharge passage 852 extends through the side wall 804. The discharge passage includes a valve arrangement 854 for variable supply of fluid material to the inlet passage 846 and variable discharge of fluid material through the discharge passage 852, whereby the degree of supercharging of the compartments 822 to 830 is variable with actuation of the valve arrangement 854. The stator chamber 811 on the opposite axial side of the rotor body 802 also includes an intake passage 862 for the induction of a combustible fuel/air mixture sequentially into the compartments 832 to 840, a discharge passage 864 being in fluid communication through a transfer passage 865 with an intake passage 866 for sequential supply of fluid material to the compartments 832 to 840, another inlet passage 868 and a discharge passage 870 extending through the side wall 805; a discharge passage 872 including a valve arrangement 874 extends through the side wall 805 from the transfer passage 865 for variable supply of fluid material to the inlet passage 866. A spark plug or other suitable ignition means 880 and 881 is provided at an appropriate position as shown in the stator chambers 810 and 811 respectively. The operation of the engine 800 including the transfer passage provides for double volume of combustible fuel/air mixture to the compartments 822 to 830 and 832 to 840 respectively when the discharge passage extending from the transfer passages 845, 846 is closed by the valve arrangement 854, 874 and the fluid material is transferred back to the compartments 822 to 830 and 832 to 840 respectively. It is to be noted that the inlet passages 846 and 866 are disposed sufficiently apart from the inlet passages 848 and 868 respectively so as not to interfere with induction of fluid material through the inlet passages 848 and 868, and the inlet passages 846 and 866 are to be narrow enough to be closed some time before the subsequent ignition by the ignition means 880 and 881 respectively takes place. At position of valves 854, 874 for discharge of fluid material through discharge passages 852 and 872 respectively, and closed position for the stator chambers 810 and 811, the engine 800 operates in similar manner to the engine generally indicated at 10 in FIGS. 1 to 3.

Figure 8:
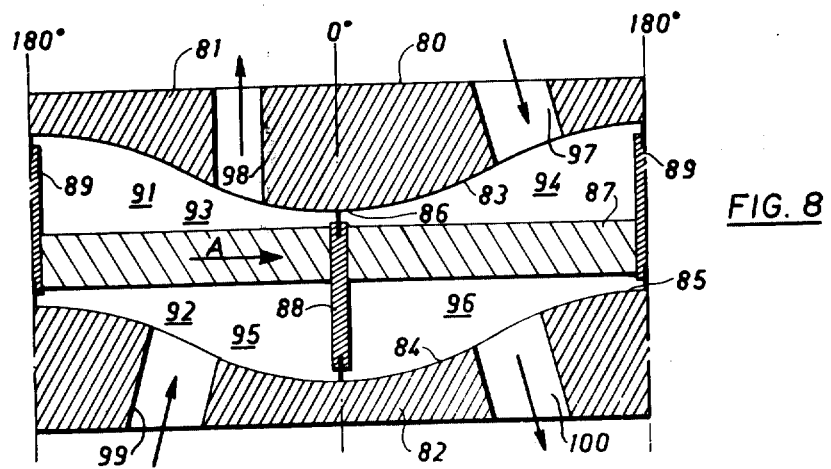
FIG. 8 is a development similar to FIG. 3 but showing another embodiment of a rotary machine and illustrating its use as a double-acting fluid pump.

The rotary machine generally indicated at 80 in FIG. 8 and intended for use as a fluid pump includes side walls 81 and 82 formed in their opposed annular surfaces 83 and 84 respectively with single complete sinusoidal configurations having inwardly disposed crests 85 and 86 respectively. A rotor body 87 having two axially reciprocable vanes 88 and 89 extending between the annular surfaces 83 and 84 is suitably journalled in the stator housing of the machine 80.

The rotor body 87 divides the stator housing of the machine 80 into two continuous stator chambers 91 and 92 on opposite sides of the rotor body 87. Vanes 88 and 89 divide each of the stator chambers 91 and 92 into two separate compartments, 93, 94 and 95, 96.

Inlet and discharge passages 97 and 98 respectively extend through the side wall 81 for the supply and discharge of a gaseous material into the compartments 93 and 94 and inlet and discharge passages 99 and 100 extend through the side wall 82 for the supply and discharge of a liquid material into the compartments 95 and 96.

The discharge passage 98 has a smaller angular extent than the discharge passage 100 since the lower stator chamber 92 is intended for pumping a non-compressible liquid material whereas the upper stator chamber 91 is intended for pumping a compressible gaseous material.

A larger number of sinusoidal curves can be provided in each of the side walls 81 and 82 and the number of vanes can be increased from the minimum number of two vanes. The manner in which the compartments 46 to 51 of the engine 10 could be used as a fluid pump with the compartments 40 to 45 on the opposite side of the rotor body 25 of that engine still functioning as a four-stroke engine will now be readily apparent. In such a case, additional fluid intake and exhaust passages would, however, be provided in appropriate positions through the side wall 12.

Figure 9:
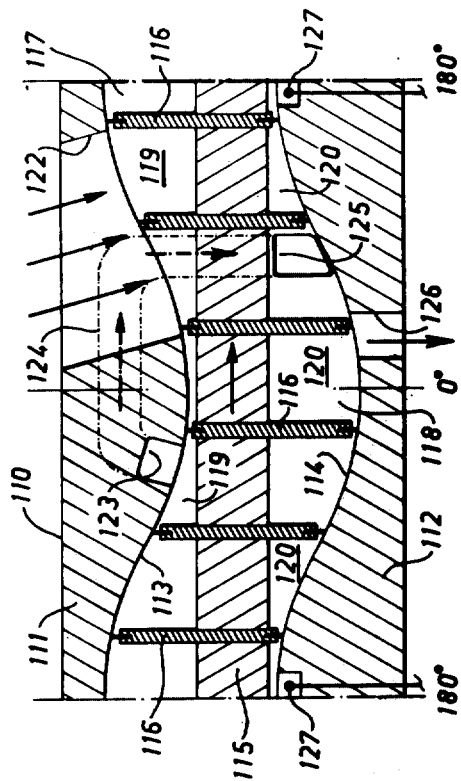
FIG. 9 is a development similar to FIG. 3 but showing another embodiment of a rotary machine and illustrating its construction for operation as a two-stroke internal combustion engine.
Figure 13:
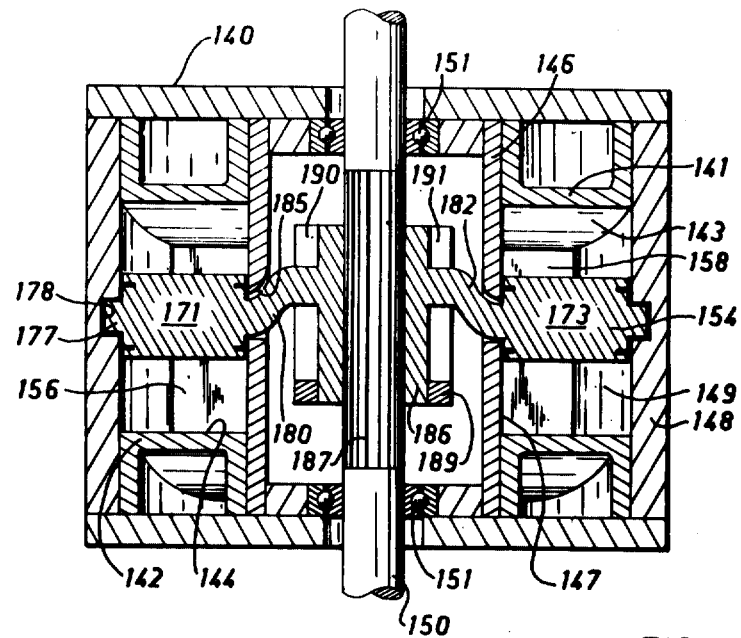
FIG. 13 is an axial sectional view through FIG. 12 showing rotor body segments of that machine in positions corresponding to those shown in FIG. 10.
Figure 14:
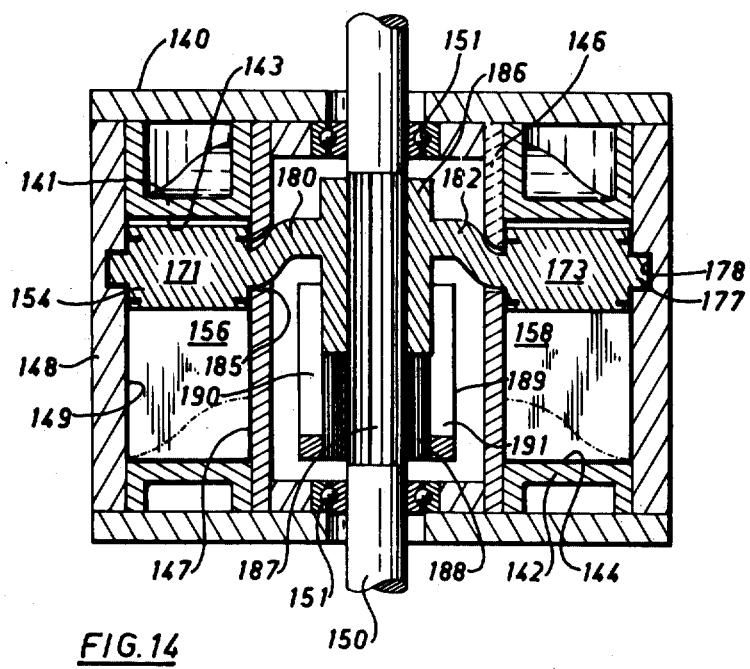
FIG. 14 is an axial sectional view similar to that of FIG. 13 through the machine of FIG. 12 but showing two of the rotor body segments of that machine in the positions shown in FIG. 11.

The engine 110 shown in FIG. 9 is intended to operate on a two-stroke cycle. It includes axially spaced apart side walls 111 and 112 with opposed and axially spaced apart annular surfaces 113 and 114 respectively, each formed with a single complete and generally sinusoidal configuration. A rotor body 115 journalled in the stator housing of the machine 110 defines, with the surfaces 113 and 114 respectively, two continuous stator chambers 117 and 118 on opposite sides of the rotor body 115. Six axially reciprocable vanes 116 are slidably supported in the rotor body 115 for axial end abutment with surfaces 113 and 114 to divide each of the stator chambers 117 and 118 into individual compartments 119 and 120 respectively.

The engine 110 also includes an intake passage 122 for the induction of a combustible fuel/air mixture sequentially into the compartments 119. A discharge passage 123 in the side wall 111 is in gaseous communication through a transfer passage 124 formed in the stator housing, or outside that housing, with an intake passage 125 communicating sequentially with the compartments 120 on the opposite side of the rotor body 115.

A spark plug or other suitable ignition means 127 is provided at an appropriate position in the stator chamber 118 while an exhaust passage 126 extends through the side wall 112.

The manner of operation of the engine 110 should be readily apparent from FIG. 9. It is to be noted that the inlet passage 125 and the exhaust passage 126 are disposed sufficiently closely together to permit some scavenging of the combustion gases from the compartments 120.

The rotary engine indicated generally at 140 in FIGS. 10 to 14 has many features in common with the engine 10 (FIGS. 1 to 7). In particular, it has a stator housing including side walls 141 and 142 with opposed axially spaced apart annular surfaces 143 and 144 respectively each formed with two complete sinusoidal curves. The stator housing also includes an inner wall 146 with a generally cylindrical peripheral outer surface 147 and an outer wall 148 with a generally cylindrical peripheral inner surface 149 parallel to surface 147 as well as to the axis of a rotor shaft 150 which is journalled in bearings 151.

A multipartite rotor body generally indicated at 154 is secured to shaft 150 for corotation therewith. Four axially reciprocable vanes 156 to 159 extend axially through the rotor body 154 for sliding end engagement with surfaces 143 and 144 and divide the stator chambers into four compartments 160 to 163 and 164 to 167 on opposite sides of the rotor body 154.

The rotor body 154 is divided into four segments 171 to 174 defining at their radially extending edges 175 and 176 guide surfaces for the vanes 156 to 159. The segments 171 to 174 are provided in their outer edges with guide members 177 received in an axially sinusoidal guideway 178 in the inner peripheral surface 149 of the outer wall 148. Arms 180 to 183 extend radially inwardly from the rotor body segments 171 to 174 respectively through an axially sinusoidal opening 185 in the inner wall 146.

Arms 180 and 182 are secured at their inner ends to an inner sleeve member 186 disposed coaxially about rotor shaft 150 and engaging that shaft through splines 187 allowing relative axial movement of the sleeve 186 on the shaft 150 and rotation of the rotor body segments 171 and 173 to drive that shaft 150.

Coaxially disposed about the sleeve member 186 and splined thereto at 188, there is an outer sleeve member 189 to which the arms 181 and 183 are secured. The sleeve member 189 is peripherally slotted at 190 and 191 in the axial direction at diametrically opposed positions to allow independent axial movement of the sleeve members 186 and 189 and consequently of the rotor body segments.

From FIGS. 10 and 11, it will be seen that the guideway 178 follows a generally sinusoidal peripheral path which is ninety degrees out of phase with the sinusoidal configurations of the surfaces 143 and 144. The guideway 178 is disposed radially opposite the opening 185 at all positions about the axis of the shaft 150 to cause axial reciprocation of the rotor body segments 171 to 174 during operation of the engine 140.

The engine 140 additionally includes first and second ignition means indicated at 194 and 195 as well as angularly spaced apart intake and exhaust passages 196, 197 and 198, 199 extending respectively through the side walls 141 and 142. In FIGS. 10 and 11, the rotor body segments 171 to 174 are shown with curved axial end surfaces to permit greater axial movement of such rotor body segments during engine operation and a greater compression ratio of the individual engine compartments 160 to 167.

During operation of the engine 140, the combustion of fuel/air mixtures within the individual engine compartments on both sides of the rotor body 154 drives the vanes 156 to 159 in turn to cause rotation of the rotor body segments as indicated by the arrows A. Such rotation is transmitted through the arms 180 to 183 to respective ones of the sleeve members 186 and 189 and consequently to the shaft 150. Engagement of the arms 180 to 183 in the opening 185 and of the guide members 177 in the guide ways 178 causes the axial reciprocation of the rotor body segments during such rotation. The combustion of fuel/air mixture also drives the individual rotor body segments axially apart from the stator side walls 141 and 142 respectively to provide a further turning couple obtained by engagement of guide members 177 with the guideway 178 for the axial reciprocation of the rotor body segments 171 to 174 during their rotation.

As a result of the additional axial reciprocation of the rotor body segments 171 to 174, a greater compression ratio can be obtained with the engine 140 than is possible for a corresponding engine constructed with a unipartite rotor body structure. The engine 140 will be provided with appropriate sealing means to prevent fluid leakage between its individual compartments and counteracting means can be provided in effect to substantially eliminate the operating stresses experienced by the mass-forces in said vanes. It must be stressed that the rotor body segments 171 to 174 are axially spaced from the side walls 141 and 142 at all positions about the rotor shaft and at all times during their rotation.

Figure 15:
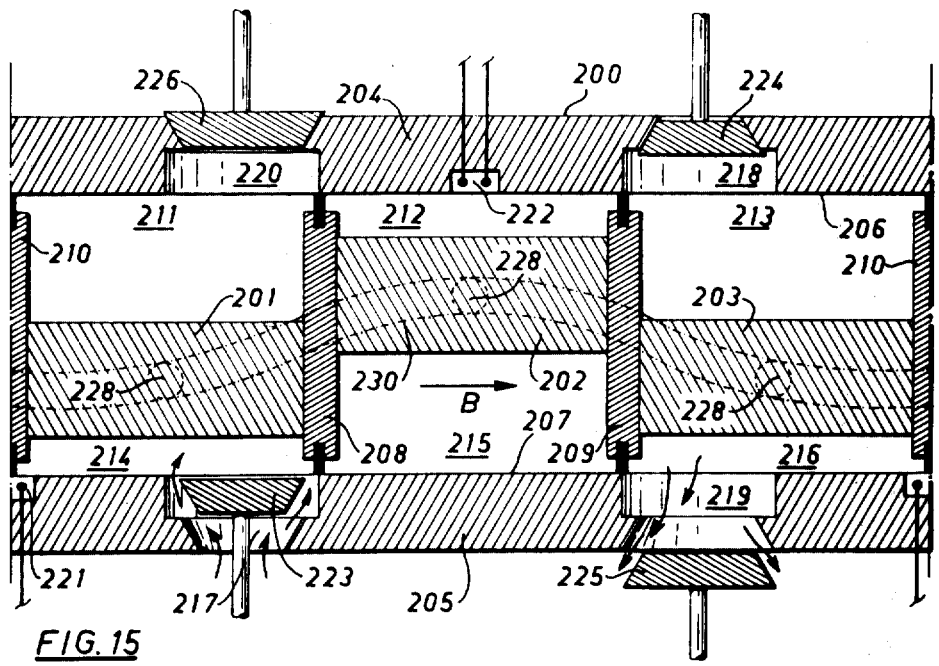
FIG. 15 is a schematic development showing one stage in an operating cycle of another embodiment of a rotary engine.

The machine generally indicated at 200 in FIG. 15 includes a rotor body formed with three axially reciprocating rotor body segments 201, 202 and 203. The stator housing includes spaced apart side walls 204 and 205 with opposed radially extending, annular and planar surfaces 206 and 207 respectively which, together with the rotor body segments 201, 202 and 203 and inner and outer walls (not shown), define continuous stator chambers on opposite sides of the rotor body. Three axially extending vanes 208, 209 and 210 divide the stator chambers into three engine compartments 211 to 213 and 214 to 216 respectively. The engine 200, which is intended for four-stroke operation, differs from the engines hereinbefore specifically described in that the cyclic variations in the volumes of the engine compartments 211 to 216 are caused solely by axial reciprocation of the rotor body segments 201 to 203. The engine 200 also includes intake passages 217 and 218, exhaust passages 219 and 220 and spark plugs 221 and 222. A further difference between the engine 200 and those previously described herein is that the intake and exhaust passages 217 to 220 are provided with valves 223 to 226 respectively which are controlled by any appropriate means (not shown) so that they open and close at required instances during the operation of the engine 200.

The axial reciprocations of the rotor body segments 201 to 203 are obtained by a suitable guide mechanism including guide pins 228 on the rotor body segments 201 to 203 and a guideway 230 provided, for example, similarly to the guideway 178 already described with reference to FIGS. 10 to 14. It must be stressed that the axial reciprocations of the rotor body segments 201 to 203 are such as to maintain at all times a certain clearance between those segments and the opposed surfaces 206 and 207 of the side walls 204 and 205 respectively.

The engine 200 is shown in FIG. 15 at a stage of its operating cycle in which a combustible fuel/air mixture is being inducted into the engine compartment 214 through open intake passage 217, the compartment 215 previously having been charged with such a mixture. The third compartment, compartment 216, of the lower stator chamber is shown as being exhausted through the open exhaust passage 219. On continued rotation of the rotor body, as indicated by the arrow B, the exhaust passage 219 is closed by valve 225 and the fuel/air mixture in compartment 215 is compressed by downward movement of the rotor body segment 202 for ignition when that compartment generally reaches the position shown in FIG. 15 for the compartment 214. At that time, the valve 223 will have moved so as to close the intake passage 217 after a fuel/air mixture has been inducted into the compartment 214. Rotation of the rotor body continues until the fuel/air mixtures in all of the engine compartments 214, 215 and 216 have been compressed and ignited, at which time the valve 225 moves to open the exhaust passage 219 so as to allow the lower compartments to be exhausted. The valve 223 then moves to open the intake passage 217 and the described operating sequence commences anew. During the operating sequence already described, a corresponding sequence is taking place in the upper engine compartments 211, 212 and 213 as will readily be understood by reference to FIG. 15.

Figure 16:
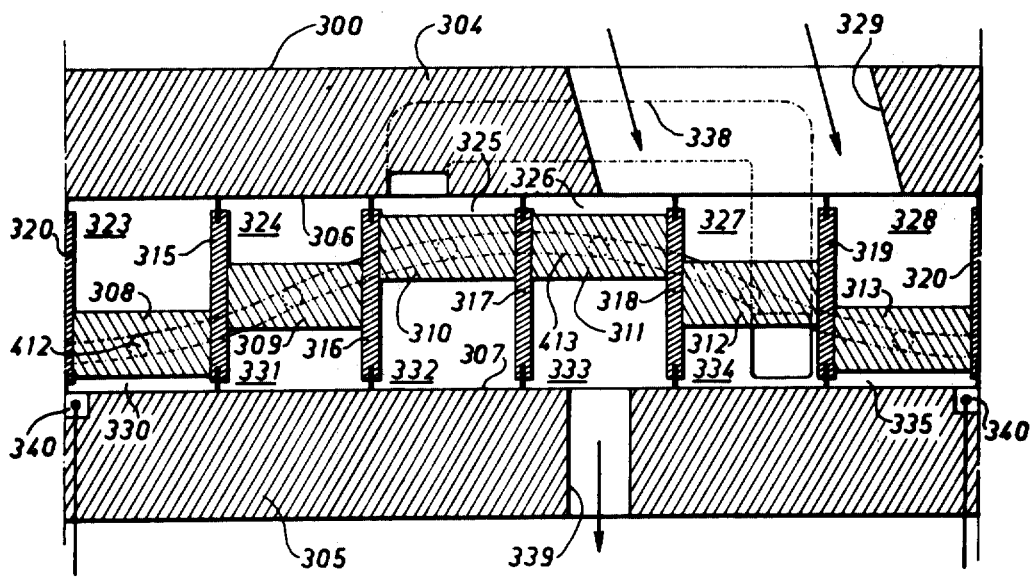
FIG. 16 is a schematic development similar to that of FIG. 15 but showing another embodiment of a rotary machine.

The engine generally indicated at 300 in FIG. 16 is similar to the engine 200 in that its stator housing includes side walls 304 and 305 with opposed generally planar surfaces 306 and 307. The engine 300 has a rotor body made up of six segments 308 to 313 supporting equiangularly spaced vanes 315 to 320. In distinction to the engine 200, the engine 300 is not provided with intake and exhaust valves and, instead, is constructed similarly to the engine 110 of FIG. 9 in that engine compartments 323 to 328 on one axial side of the rotor body function for fuel/air intake through intake passages 329 and for fuel/air compression while engine compartments 330 to 335 on the opposite axial side of the rotor body function for ignition, expansion and exhaust, a transfer passage 338 extending through the stator housing for the transfer of compressed fuel/air mixture sequentially from the compartments of the first or upper stator chamber to those of the second or lower stator chamber. An exhaust passage 339 is provided in the side wall 305. The engine 300 is provided with a single spark plug 340. Rotor body segment guidance can be provided in a similar manner to that described for the engine 200.

Figure 17:
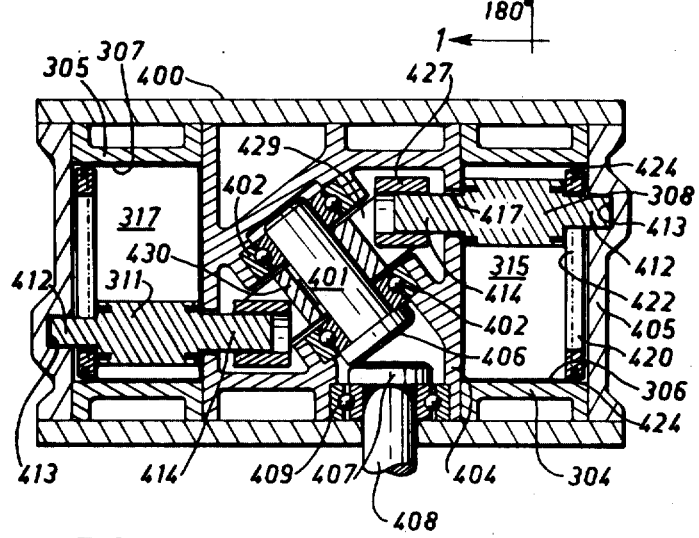
FIG. 17 is an axial sectional view through an embodiment of a rotary machine suitable for operation in the manner illustrated in FIG. 16.

Since the engine 400 shown in FIG. 17 can be operated as already described with reference to FIG. 16, the same legends are used, where applicable, on the two figures. The engine 400 includes a rotor shaft 401 which is journalled in bearings 402 in the stator housing, the shaft 401 being obliquely disposed with respect to the axes of inner and outer stator chamber walls 404 and 405 respectively. The rotor shaft 401 has a bevel gear 406 keyed to one end thereof for engagement with a similar gear 407 carried by a main shaft 408 journalled in a bearing 409 in the stator housing.

Each of the rotor body segments 308 to 313 is formed with a radially outwardly extending guide pin 412 indicated schematically in FIG. 16 and received in a sinusoidal guideway 413 formed in the peripheral inner surface of the outer wall 405. Radially inwardly extending arms 414 extend through a corresponding sinusoidal opening 417 formed in the inner wall 404.

The vanes 315 to 320 are supported in the engine 400 between the rotor body segments 308 to 313 by a cylindrical sleeve 420 which is longitudinally grooved as indicated at 422 to support the vanes in fixed positions relative thereto. The sleeve 420 is disposed within the stator chamber for co-rotation therein with the rotor body segments. The sleeve 420 includes longitudinal openings through which the guide pins 412 extend outwardly into the guideway 413. Suitable seals 424 are provided between the sleeve 420 and the side walls 304 and 305.

At their inner ends, the arms 414 are telescopically and rotably received within internally bored bushings 427 which are, in turn, pivotally mounted in bifurcated arms 429 extending radially outwardly from a sleeve 430 keyed to the rotor shaft 401 and coaxially disposed therearound.

Various modifications may be constructed or performed within the scope of the inventive concept disclosed. Therefore, what has been set forth is intended to illustrate such concept and is not for the purpose of limiting protection to any particularly described embodiment thereof.

The invention claimed is:
1. A rotary machine which comprises:
 i. a stator housing including axially spaced apart first and second side walls with opposed radially extending annular surfaces of spaced corresponding annular and generally sinusoidal configuration in the direction of the rotary axis thereof having a substantially constant axial separation;
 ii. an inner wall extending between said first and second side walls of said stator housing and having a cylindrical peripheral outer surface;
 iii. an outer wall extending between said first and second side walls of said stator housing and having a cylindrical peripheral inner surface generally parallel to said cylindrical peripheral outer surface of said inner wall;
 iv. a rotary shaft journalled in said stator housing for rotation therein;
 v. rotor means connected to said rotor shaft and extending from said inner wall to said outer wall and between said first and second side walls of said stator housing in axially spaced apart disposition thereto so as to define with said
  a. annular surfaces of said first and second side walls of said stator housing, with said
  b. cylindrical peripheral outer surface of said inner wall and with said
  c. cylindrical peripheral inner surface of said outer wall,
 first and second continuous and essentially mutually isolated stator chambers on opposite axial sides of said rotor body;
 vi. a plurality of vanes axially movably supported in said rotor means and extending between said annular surfaces of said first and second side walls of said stator housing and between said cylindrical peripheral outer surface of said inner wall and said cylindrical peripheral inner surface of said outer wall to divide each of said first and second stator chambers into a plurality of essentially mutually isolated compartments;

vii. a fluid inlet passage in said stator housing and in fluid communication with at least one of said stator chambers for the sequential supply of a fluid material to individual ones of said compartments of said stator chamber on rotation of said rotor means in said stator housing; and viii. a fluid discharge passage in said stator housing and spaced apart from said fluid inlet passage and in fluid communication with said stator chamber for the sequential discharge of fluid material from individual ones of said compartments of said stator chamber;

whereby, on rotation of said rotor means within said stator housing, said vanes and said rotor means undergo relative axial movement to cause variation in the volumes of said compartments of said stator chamber and to cause, in turn, fluid material introduced sequentially into said compartments of said stator chamber through said fluid inlet passage to be discharged sequentially from said compartments of said stator chamber through said fluid discharge passage; and in which each of said first and second side walls of said stator housing is formed with three said complete and generally sinusoidal configurations, each said side wall including first, second and third crest disposed in close proximity to but axially spaced apart from said rotor means, which machine additionally includes a first ignition means operatively associated with said stator chamber in general proximity to the third crest of said first side wall and in which a discharge passage and a first inlet passage communicate with said stator chamber on opposite sides of said first crest and in which a second discharge and a second inlet passage communicate with said stator chamber on opposite sides of said second crest and in which a third inlet passage communicates with said stator chamber at said third crest, said second discharge passage at said second crest and said third inlet passage at said third crest being in fluid communication through a transfer passage extending through said stator housing whereby on rotation of said rotor means fluid material being introduced sequentially into said compartments of said stator chamber through said first inlet passage and discharged through said second discharge passage into said transfer passage and fresh fluid material being introduced into said compartments through said second inlet passage with subsequent further supply of said fluid material from said transfer passage through said third inlet passage so as to increase the volume of fluid material supplied to said compartments, said fluid material being discharged through said first discharge passage, whereby said stator chamber can operate on a 4-stroke cycle.

2. A rotary machine as claimed in claim 1 which additionally includes a second ignition means operatively associated with said second stator chamber in general proximity to said third crest of said second side wall and in turn said first, second and third inlet passages, said first and second discharge passages and said transfer passage communicate with said second stator chamber through said second side wall whereby said first and second stator chambers of said rotary machine can operate on a 4-stroke cycle.

3. A rotary machine as claimed in claim 2 including a discharge passage extending from said transfer passage through said side wall and which includes a valve arrangement operatively associated within said discharge and transfer passage so as to direct said fluid material in varying degree through said discharge passage, whereby the degree of supercharging can be varied by actuating said valve arrangement.

4. A rotary machine comprising;
  i. a stator housing including axially spaced apart first and second side walls with opposed radially extending annular surfaces of spaced corresponding annular and generally sinusoidal configuration in the direction of the rotary axis thereof having a substantially constant axial separation;
  ii. an inner wall extending between said first and second side walls of said stator housing and having a cylindrical peripheral outer surface;
  iii. an outer wall extending between said first and second side walls of said stator housing and having a cylindrical peripheral inner surface generally parallel to said cylindrical peripheral outer surface of said inner wall;
  iv. a rotary shaft journalled in said stator housing for rotation therein;
  v. rotor means connected to said rotor shaft and extending from said inner wall to said outer wall and between said first and second side walls of said stator housing in axially spaced apart disposition thereto so as to define with said
    a. annular surfaces of said first and second side walls of said stator housing, with said
    b. cylindrical peripheral outer surface of said inner wall and with said
    c. cylindrical peripheral inner surface of said outer wall,
  first and second continuous and essentially mutually isolated stator chambers on opposite axial sides of said rotor body;
  vi. a plurality of vanes axially movably supported in said rotor means and extending between said annular surfaces of said first and second side walls of said stator housing and between said cylindrical peripheral outer surface of said inner wall and said cylindrical peripheral inner surface of said outer wall to divide each of said first and second stator chambers into a plurality of essentially mutually isolated compartments;
  vii. a fluid inlet passage in said stator housing and in fluid communication with at least one of stator chambers for the sequential supply of a fluid material to individual ones of said compartments of said stator chamber on rotation of said rotor means in said stator housing; and
  viii. a fluid discharge passage in said stator housing and spaced apart from said fluid inlet passage and in fluid communication with said stator chamber for the sequential discharge of fluid material from individual ones of said compartments of said stator chamber;
  whereby, on rotation of said rotor means within said stator housing, said vanes and said rotor means undergo relative axial movement to cause variation in the volumes of said compartments of said stator chamber and to cause, in turn, fluid material introduced sequentially into said compartments of said stator chamber through said fluid inlet passage to be discharged sequentially from said compartments of said stator chamber through said fluid discharge passage;

in which each of said first and second side walls of said stator housing is formed with at least one said complete and generally sinusoidal configuration including a crest disposed in close proximity to but axially spaced apart from said rotor means in which a fluid discharge passage of said first stator chamber and a fluid inlet passage of said second stator chamber are in fluid communication with each other through a fluid transfer passage extending through said stator housing and which machine additionally comprises ignition means operatively associated with said second stator chamber in general proximity to said crest of said second side wall of said stator housing whereby a combustible fluid material supplied sequentially to said compartments of said first stator chamber is, on rotation of said rotor body within said stator housing, compressed and discharged through said fluid discharge passage into said transfer passage for supply through said fluid inlet passage to said compartments of said second stator chamber, and whereby ignition of said combustible fluid material occurs sequentially in said compartments of said second stator chamber, and the exhaust of said combustible fluid material, after the combustion thereof, takes place through a fluid discharge passage.

5. A rotary machine as claimed in claim 4 which includes at least two said vanes and in which said vanes are supported in said rotor means for generally axial reciprocating movement therethrough in generally equiangular disposition about said rotor shaft.

* * * * *